(12) United States Patent
Kinoshita

(10) Patent No.: US 7,923,676 B2
(45) Date of Patent: Apr. 12, 2011

(54) OPTICAL UNIT, SOLID-STATE IMAGE SENSING DEVICE WITH POSITION ADJUSTING SECTION AND ELECTRONIC APPARATUS COMPRISING SAME

(75) Inventor: Kazuo Kinoshita, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 73 days.

(21) Appl. No.: 12/150,281

(22) Filed: Apr. 24, 2008

(65) Prior Publication Data

US 2008/0265134 A1    Oct. 30, 2008

(30) Foreign Application Priority Data

Apr. 27, 2007  (JP) ................. 2007-120200

(51) Int. Cl.
*H01L 27/00* (2006.01)
*H01J 3/14* (2006.01)
*H01J 5/02* (2006.01)

(52) U.S. Cl. ............ 250/208.1; 250/216; 250/239

(58) Field of Classification Search .......... 250/208.1, 250/221, 239, 216; 257/433, 434, 678, 680; 438/64–67, 106, 116, 127
See application file for complete search history.

(56) References Cited

U.S. PATENT DOCUMENTS

| | | | |
|---|---|---|---|
| 5,768,038 A | 6/1998 | Emura | |
| 6,085,039 A * | 7/2000 | Hamada et al. | 396/54 |
| 2004/0095499 A1* | 5/2004 | Ning | 348/335 |
| 2004/0189854 A1 | 9/2004 | Tsukamoto et al. | |
| 2004/0207745 A1* | 10/2004 | Tsuruta et al. | 348/335 |
| 2005/0129384 A1* | 6/2005 | Nishida et al. | 385/147 |
| 2005/0152050 A1 | 7/2005 | Noda et al. | |
| 2005/0163016 A1 | 7/2005 | Kimura | |
| 2006/0132936 A1 | 6/2006 | Yu | |
| 2006/0153556 A1* | 7/2006 | Lee et al. | 396/133 |
| 2006/0219884 A1 | 10/2006 | Tsukamoto et al. | |
| 2006/0219885 A1 | 10/2006 | Kinoshita et al. | |
| 2006/0221225 A1 | 10/2006 | Tsukamoto et al. | |
| 2007/0030334 A1 | 2/2007 | Nishizawa | |
| 2007/0053082 A1 | 3/2007 | Sue et al. | |
| 2008/0212959 A1* | 9/2008 | Shin et al. | 396/508 |

FOREIGN PATENT DOCUMENTS

| | | |
|---|---|---|
| CN | 1790149 A | 6/2006 |
| JP | 04-050906 A | 2/1992 |
| JP | 04-050907 A | 2/1992 |
| JP | 10-90584 A | 4/1998 |
| JP | 2003-295033 A | 10/2003 |
| JP | 2005-37865 A | 2/2005 |
| JP | 2006-049371 A | 2/2006 |

(Continued)

*Primary Examiner* — Que T Le
*Assistant Examiner* — Pascal M Bui-Pho
(74) *Attorney, Agent, or Firm* — Edwards Angell Palmer & Dodge LLP; David G. Conlin; Catherine J. Toppin

(57) ABSTRACT

A camera module 100a includes a lens unit 1a, which includes a lens 11 and a lens holder 12 holding the lens 11 therein, and an image sensing unit 2a, which has a solid-state image sensor 24. A position adjustment of the lens 11 is performed by moving the lens 11 independently of the lens holder 12, by use of electromagnetic force. This allows a fine adjustment of a position of the lens 11, thereby improving the alignment precision of the lens 11. Thus, a solid-state image sensing device is provided, which can make fine adjustments of focal lengths.

8 Claims, 15 Drawing Sheets

FOREIGN PATENT DOCUMENTS

| | | |
|---|---|---|
| JP | 2006-195452 A | 7/2006 |
| JP | 3124292 U | 7/2006 |
| JP | 2006-276463 A | 10/2006 |
| JP | 2006-279533 A | 10/2006 |
| JP | 2006-287533 A | 10/2006 |
| JP | 2007-052199 A | 3/2007 |
| JP | 2007-94364 A | 4/2007 |
| JP | 2007-108413 A | 4/2007 |

* cited by examiner

OPTICAL UNIT, SOLID-STATE IMAGE SENSING DEVICE WITH POSITION ADJUSTING SECTION AND ELECTRONIC APPARATUS COMPRISING SAME

This Nonprovisional application claims priority under 35 U.S.C. §119(a) on Patent Application No. 120200/2007 filed in Japan on Apr. 27, 2007, the entire contents of which are hereby incorporated by reference.

FIELD OF THE INVENTION

The present invention relates to an optical unit which can change a position of a lens held by a lens holder by use of electromagnetic force, and a solid-state image sensing device and an electronic apparatus, each of which incorporates such an optical unit.

BACKGROUND OF THE INVENTION

Conventional camera modules (solid-state image sensing devices) for capturing images used in portable phones and the like are arranged such that a circuit board, a lens, and a lens holder are incorporated into a package. The circuit board includes a solid-state image sensor (CCD (charge-coupled device) or CMOS (complementary metal-oxide semiconductor) sensor IC (integrated circuits)), an infrared filter, and a terminal. The lens holder holds the lens.

It is important for these camera modules to satisfy the following two conditions: (a) an optical center of the image sensing surface of the solid-state image sensor corresponds to an optical center of the lens; and (b) the plane surface of the image sensing surface and the optical axis of the lens are orthogonal to each other.

Poor alignment precision of the lens with respect to the solid-state image sensor disables the satisfaction of these conditions. This causes problems such as images are out of focus, or images are recognized dark by the solid-state image sensor.

In response to this, the position of the lens is adjusted at the final stage of manufacture right before the camera module is shipped, so as to satisfy the conditions. The distance from the center of the lens to the image sensing surface of the solid-state image sensor (optical distance or focal length) is adjusted to the image forming length of the lens in this adjustment of lens position.

However, an optical adjustment step requires high-cost investment in plant and equipment, as well as manpower. In addition, optical adjustment requires considerable skill; plenty of work hours are also required.

Furthermore, the lens holder requires a specific arrangement for optical adjustment in order to perform optical adjustment. Therefore, it is difficult to downsize the conventional camera module structurally. In addition, mass production is difficult if the lens holder is constructed by mechanical components. Moreover, material costs and the like occupy a high proportion of production costs. Consequently, production costs increase.

Patent Document 1 discloses a camera module which can easily perform optional adjustment, as illustrated in FIG. 20. In this camera module, a lens 211 is held by a lens holder 201. The lens holder 201 has contact with a glass plate 226. The glass plate 226 is arranged on the top surface of a solid-state image sensor 224 in high precision. This lens holder 201 is adhered to a circuit board 221 with an adhesive 227. This arrangement enables the optical distance (focal length) and the image forming length of the lens to be of the same length. The optical distance is the distance between the lens 211 and the solid-state image sensor 224. Thus, an optical adjusting step is not required in this arrangement.

Patent Document 2 discloses a lens driving device as illustrated in FIG. 21. An object of the lens driving device in Patent Document 2 is to reduce the size and weight of the lens driving device, and to prevent undesirable radial movement, even if the lens is moved in a straight direction. The lens driving device in FIG. 21 is arranged such that lenses 311a and 311b are moved to a position where electromagnetic force and elastic force of springs 313a and 313b are proportionate. The lens driving device allows the adjustment by use of electromagnetic force, by applying electric current to coils 315a and 315b.

Patent Document 1
Japanese Unexamined Patent Publication, Tokukai, No. 2004-301938 (published on Oct. 28, 2004)
Patent Document 2
Japanese Unexamined Patent Publication, Tokukai, No. 2003-295033 (published on Oct. 15, 2003)

However, in the conventional arrangement, it is difficult to make fine adjustments in the lens position, thus causing the problem of poor lens alignment precision.

More specifically, the arrangement of Patent Document 1 is of a single-vision. Therefore, a position of a lens 211 cannot be changed once the camera module is assembled.

The arrangement of Patent Document 2 moves the lens by moving the whole lens holder. This inevitably requires a magnet (not illustrated), the coils 315a and 315b and the like of large size. Consequently, the weight which needs to be driven together with the lenses 311a and 311b is heavy. As a result, the fine adjustment of the position of the lenses 311a and 311b becomes extremely difficult to perform. Furthermore, a response speed in adjusting the position of the lenses 311a and 311b is slow, and electricity consumption required to adjust the lens position also increases.

SUMMARY OF THE INVENTION

The present invention is made in consideration of the problems, and an object thereof is to provide an optical unit which performs lens alignment in high precision, and which can easily make fine adjustments in lens position, and a solid-state image sensing device and an electronic apparatus, each of which incorporate such an optical unit.

In order to attain the object, the solid-state image sensing device of the present invention is a solid-state image sensing device which includes an optical unit including a lens and a lens holder holding the lens therein, and an image sensing unit having a solid-state image sensor, the solid state image sensing device including: a position adjusting section for adjusting a position of the lens by moving the lens, independently of the lens holder, by use of electromagnetic force.

Conventional solid-state image sensing devices, when adjusting the lens position, move the lens holder which holds the lens, and not the lens itself. Therefore, the load on a position adjusting section is great when adjusting the lens position. The fine adjustment in lens position is thus extremely difficult, and the response speed when adjusting the lens position is also slow. Consequently, the electricity consumption required for adjusting the lens position increases.

In response to this, according to the invention, the position adjusting section adjusts the position of the lens by moving the lens by the use of the electromagnetic force. In addition, the position adjusting section moves the lens, independently of the lens holder. This makes the load small on the position adjusting section when adjusting the lens position. Therefore, the fine adjustment is easily performed, and a high lens alignment precision is thus attained. Furthermore, this allows the response speed to increase when adjusting the lens position, as well as reducing the amount of electricity consumption required in the lens position adjustment.

"Lens position" indicates the position of the lens with respect to the solid-state image sensor, that is, the position where the lens is held. "Adjusting the lens position" indicates changing of this position as one chooses, by adjusting the distance between the lens and the solid-state image sensor, or adjusting the position where the lens is held. The position adjusting section is sufficient provided that the section adjusts at least one of the position of a lens or a plurality of lens included in the optical unit (lens unit).

In order to attain the object, an electronic apparatus of the present invention includes the aforementioned solid-state image sensing device.

According to the invention, the electronic apparatus is provided with the solid-state image sensing device of the present invention. Thus, it is possible to provide an electronic apparatus which can easily perform fine adjustment of the lens position.

In order to attain the object, an optical unit of the present invention is an optical unit which includes a lens and a lens holder holding the lens therein, the optical unit including: a position adjusting section adjusting a position of the lens by moving the lens, independently of the lens holder, by use of electromagnetic force.

According to the invention, the position adjusting section adjusts the position of the lens by moving the lens by use of the electromagnetic force. In addition, the position adjusting section moves the lens, independently of the lens holder. This makes the load small on the position adjusting section when adjusting the lens position. Therefore, the fine adjustment is easily performed, and a high lens alignment precision is thus attained. Furthermore, this allows the response speed to increase when adjusting the lens position, as well as reducing the amount of electricity consumption required in the lens position adjustment.

Additional objects, features, and strengths of the present invention will be made clear by the description below. Further, the advantages of the present invention will be evident from the following explanation in reference to the drawings.

DESCRIPTION OF THE EMBODIMENTS

One embodiment of the present invention is described below with reference to drawings.

A solid-state image sensing device of the present invention is suitable for electronic apparatuses capable of taking photographs, such as portable phones with a built-in camera, digital still cameras, and such as security cameras. The present embodiment describes a camera module (solid-state image sensing device) applied to a portable phone with a built-in camera.

Figure 1:
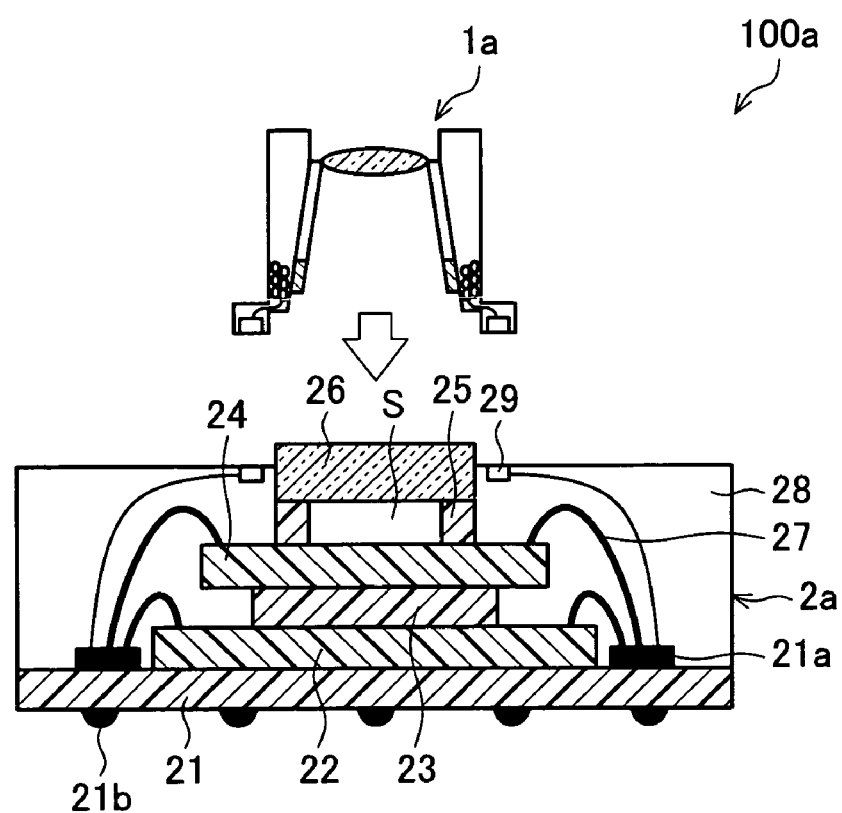
FIG. 1 is a cross sectional view of a camera module pertaining to one embodiment of the present invention.

FIG. 1 is a cross sectional view of a camera module 100a of the present embodiment. The camera module 100a is manufactured by combining a lens unit (optical unit) 1a and an image sensing unit 2a. The lens unit 1a is mounted on the image sensing unit 2a. For the sake of easy explanation, the side where the lens unit 1a is located is denoted as an upper side, and the side where the image sensing unit 2a is located is denoted as a lower side in the following description.

<Lens Unit 1a>

Figure 2:
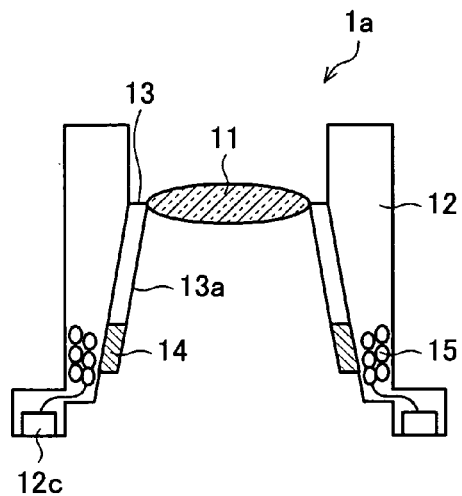
FIG. 2 is a cross sectional view of a lens unit in the camera module shown in FIG. 1.
Figure 3:
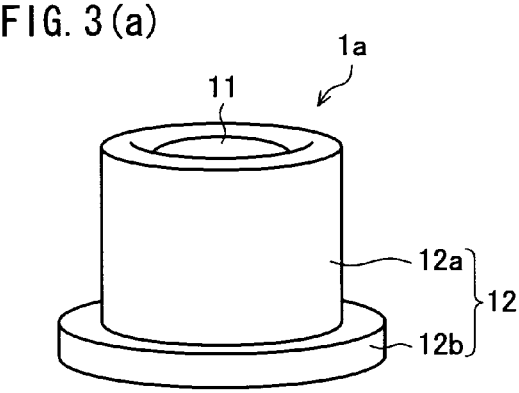
FIG. 3(a) is a perspective view of an external view of a lens unit of the camera module shown in FIG. 1.
FIG. 3(b) is a top view of a lens unit of the camera module shown in FIG. 1.
Figure 3:
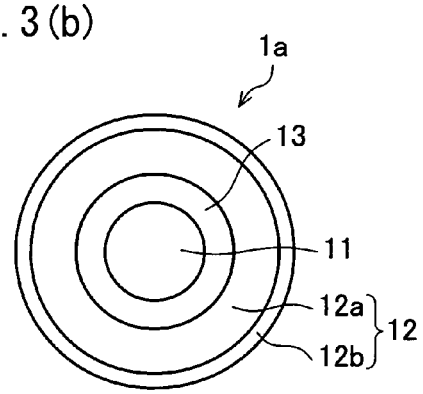
Figure 4:
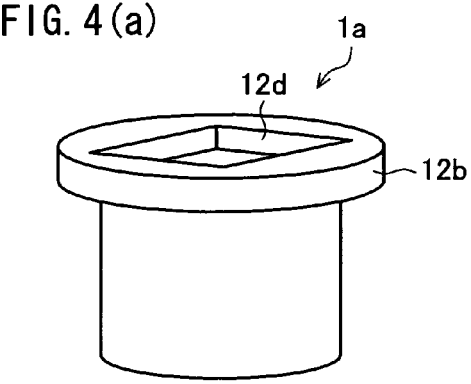
FIG. 4(a) is a perspective view of an external view of a lens unit of the camera module shown in FIG. 1.
FIG. 4(b) is a bottom view of a lens unit of the camera module shown in FIG. 1.
Figure 4:
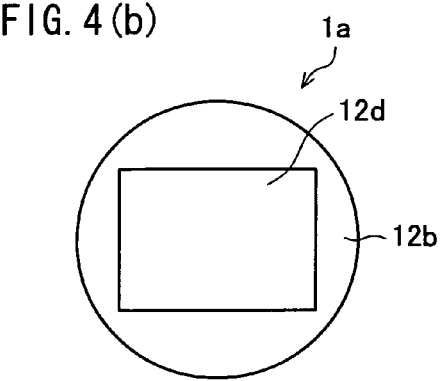

The following description deals with the lens unit 1a. FIG. 2 is a cross sectional view of the lens unit 1a. FIG. 3(a) is a perspective view of an external view of the lens unit 1a. FIG. 3(b) is a top view of the lens unit 1a. FIG. 4(a) is a perspective view illustrating an external view of the lens unit 1a shown in FIG. 3(a), transposing the top and bottom (front and back) thereof. FIG. 4(b) is a bottom view of the lens unit 1a.

The lens unit 1a is a photographic optical system (optical structure) which forms a subject image. Namely, the lens unit 1a is an optical path demarcation device for guiding light from an outside to a receiving surface (image sensing surface) of the image sensing unit 2a.

The lens unit 1a includes a lens 11, a lens holder 12, an elastic body 13, an elastic body retainer 13a, a magnetic body 14, and a coil 15, as illustrated in FIG. 2. In the present embodiment, the elastic body 13, the elastic body retainer 13a, the magnetic body 14, and the coil 15 function as a position adjusting section which adjusts the position of the lens 11, as later described. The position adjusting section is a driving section (driving device) for driving the lens 11.

The lens holder 12 is a frame body for holding (supporting) the lens 11 therein. The lens 11 is arranged in the upper center of the lens holder 12. The lens holder 12 functions so as to arrange the lens unit 1a on the image unit 2a in an appropriate position. The lens holder 12 is a hollow (tubular) member, and the lens 11 is held therein. Therefore, an optical path is secured from the lens 11 to the receiving surface of a solid-state image sensor 24.

The lens holder 12 includes a lens barrel section 12a and an alignment section 12b. The lens 11 is arranged in the upper center of the lens barrel section 12a. The alignment section 12b arranges the lens unit 1a on the image sensing unit 2a in the appropriate position. In other words, the lens barrel section 12a is a fuselage section of the lens unit 1a, whereas the alignment section 12b is a flange of the lens unit 1a.

The elastic body 13 and the magnetic body 14 are provided in an internal surface section (internal side surface) of the lens barrel section 12a, as illustrated in FIG. 2. The coil 15 is buried inside the lens holder 12, in the vicinity of the magnetic body 14. The elastic body 13 and the magnetic body 14 are coupled with each other by the elastic body retainer 13a. The elastic body retainer 13a is not connected to the lens holder 12 (lens barrel section 12a).

The elastic body is ring-shaped, and the lens 11 is held by the inner circumference of the elastic body 13. The elastic body 13 holds the lens 11 so that an axis of the lens holder 12 is concentric to the optical axis of the lens 11. The elastic body retainer 13a and the magnetic body 14 are both hollow (tubular) members. The elastic body 13 and the magnetic body 14 are arranged on the top-end part and the bottom-end part of the elastic body retainer 13a, respectively. The lens unit 1a has the lens 11 in the center thereof, and surrounding the lens 11, the elastic body 13 and the lens holder 12 (lens barrel section 12a, alignment section 12b) are arranged in the order as described, as illustrated in FIG. 13(b).

The elastic body 13 is flexible, and changes the position of the lens 11 using this flexibility. The elastic body 13 expands and contracts by the use of the electromagnetic force. The elastic body retainer 13a is also flexible, and works with the expanding and contracting movement of the elastic body 13. The electromagnetic force which causes the elastic body 13 to expand and contract generates due to a magnetic field acting on the magnetic body 14. This magnetic field generates from the coil 15. The camera module 100a controls the position of the lens 11 by the use of such electromagnetic force. The present embodiment provides the elastic body 13, the magnetic body 14, and the coil 15, which integrally function as the position adjusting section, all in the lens unit 1a. Therefore, it is possible to arrange the elastic body 13, the magnetic body 14, and the coil 15 close together. Thus, it is possible to realize the downsizing and weight reduction of the position adjusting section. Furthermore, the magnetic body 14 and the coil 15 are arranged close to each other, thereby enabling to move the lens 11 with a small magnetic force. Electricity consumption is thus reduced, and also leakage of magnetic force is reduced.

The position adjustment of the lens 11 is later described. The elastic body 13 may be, for example, a spring, a rubber, an elastomer or the like.

On the other hand, the alignment section 12b has a larger diameter than the lens barrel section 12a. On the bottom part of the alignment section 12b, joints (connecting terminals) are provided for supplying electric current to the coil 15. An opening 12d is provided on the alignment section 12b, as illustrated in FIGS. 4(a) and 4(b). The opening 12d is of a shape which engages with the shape of the area where the lens unit 1a is to be arranged on the image sensing unit 2a. Therefore, the lens unit 1a is unmistakably mounted on the image sensing unit 2a on the appropriate position because of the opening 12d, as later described. The opening 12d performs alignment function of the lens unit 1a and the image sensing unit 2a.

<Image Sensing Unit 2a>

The following description deals with the image sensing unit 2a.

The image sensing unit 2a is an image sensing section which converts a subject image formed by the lens unit 1a to electric signals. In other words, the image sensing unit 2a is a sensor device which photoelectrically converts incident light from the lens unit 1a.

The image sensing unit 2a includes a circuit board 21, a DSP (digital signal processor) 22, a spacer 23, the solid-state image sensor 24, an adhesive section 25, and the transparent lid section 26. The DSP 22, the spacer 23, the solid-state image sensor 24, the adhesive section 25 and the transparent lid section 26 are stacked on the circuit board 21. Terminals 21a are formed on the surface of the circuit board 21 (surface on which the DSP 22 and the other components are mounted). The terminals 21a are electrically connected to the DSP 22 and the solid-state image sensor 24 via wires 27, respectively. Furthermore, the terminals 21a are electrically connected to joints 29, which supply electric current to the coil 15 of the lens unit 1a. In FIG. 1, the image sensing unit 2a is arranged so that each member assembled on the circuit board 21 is sealed with a sealing section 28 (resin sealing). The sealing section 28 is formed from mold resin. The sealing section 28 seals the members so that the surface of the joints 29 is exposed.

The following description deals with each of the members included in the image sensing unit 2a in detail.

The circuit board 21 is a board which has a patterned wiring (not illustrated). The circuit board 21 is, for example, a print board, a ceramic board, or the like. The terminals 21a for wire bonding and electrodes 21b for external connection are formed on the top surface and the bottom surface of the circuit board 21, respectively. The terminals 21a and the electrodes 21b are electrically connected with each other.

The terminals 21a are electrically connected with the DSP 22 and the solid-state image sensor 24 via the wires 27, respectively. The DSP 22 and the solid-state image sensor 24 are stacked on a central part of the circuit board 21. The electrical connections of these components enable sending and receiving of electric signals. The terminals 21a are also electrically connected to the joints 29. This enables supplying of electricity to the coil 15. The electrodes 21b enable input and output of signals between the camera module 100a and the electronic apparatus such as a digital camera or a portable phone with a built-in camera, which are equipped with the camera module 100a.

The DSP 22 is a semiconductor chip which controls the performance of the solid-state image sensor 24, and processes the signal outputted from the solid-state image sensor 24. The circuit board has other electronic components thereon, such as a CPU, a ROM, and a RAM, though these are not illustrated. The CPU performs various operation processes in accordance with a program. The ROM stores the program, and the RAM stores data and the like for each of the processes. These electronic components control the camera module 100a as a whole.

On the surface of the DSP 22, a plurality of bonding pads (not illustrated) are formed for input and output of electric signals.

The spacer 23 is arranged between the DSP 22 and the solid-state image sensor 24. The spacer 23 adjusts the distance between the DSP 22 and the solid-state image sensor 24. Specifically, the height of the spacer 23 is adjusted so as to avoid contact of the wire 27 to be connected to the DSP 22 and the wire 27 to be connected to the solid-state image sensor 24. For the spacer 23, for example, a silicon piece may be applied.

The solid-state image sensor 24 converts the subject image formed by the lens unit 1a to electric signals. In other words, the solid-state image sensor 24 is a sensor device which photoelectrically converts incident light from the lens unit 1a. The solid-state image sensor 24 is, for example, a CCD or a CMOS sensor IC. A receiving surface is formed on the surface (top surface) of the solid-state image sensor 24. The receiving surface has a plurality of pixels arranged in matrix form. The receiving surface is an area which forms an image using the incident light from the lens unit 1a (image forming area), and may be referred as a pixel area. The image sensing surface of the image sensing unit 2a is this receiving surface (pixel area).

The solid-state image sensor 24 converts the subject image formed on the receiving surface (pixel area) to electric signals. The electric signals are then outputted as analog image signals. That is to say, photoelectric conversion is performed on the receiving surface. The operation of the solid-state image sensor 24 is controlled at the DSP 22. The image signals created at the solid-state image sensor 24 are processed at the DSP 22.

An adhesive section 25 is provided on the surroundings of the receiving surface of the solid-state image sensor 24. The adhesive section 25 adheres the transparent lid section 26 on the solid-state image sensor 24. The receiving surface of the solid-state image sensor 24 is thus covered by the transparent lid section 26.

The adhesive section 25 is provided so as to peripherally surround the receiving surface of the solid-state image sensor 24. The adhesive section 25 adheres the transparent lid section 26 to the solid-state image sensor 24, so as to face the receiving surface of the solid-state image sensor 24. The adhesive section 25 adheres the receiving surface of the solid-state image sensor 24 and the transparent lid section 26 so that a space (gap) S is formed therebetween. Sealing the space S prevents the penetration of moisture to the receiving surface, and the penetration and adhering of dust on the receiving surface. Thus, occurrence of malfunction on the receiving surface is prevented.

The transparent lid section 26 is formed from transparent members such as glass. In the camera module 100a, the transparent lid section 26 is engaged with the lens holder 21, and the size of the transparent lid section 26 is smaller than that of the solid-state image sensor 24. Consequently, downsizing of the transparent lid section 26 enables the downsizing of the lens holder 12 (and thus the lens unit 1a). That is to say, it is possible to realize a camera module 100a downsized to a chip-size.

In the present embodiment, an infrared ray insulating film is formed on the surface of the transparent lid section 26 (surface exposed from the sealing section 28). Therefore, the transparent lid section 26 also has a function to block infrared rays.

The adhesive section 25 is formed by, for example, a patterning which processes exposure and development by photolithography technique, following the attachment of a sheet-shaped adhesive on the solid-state image sensor 24. The use of photolithography technique allows high precision patterning of the adhesive section 25. In addition, the use of sheet-shaped adhesives allows even thickness of the adhesive section 25. Thus, the transparent lid section 26 is adhered in high precision, to the receiving surface of the solid-state image sensor 24.

Figure 5:
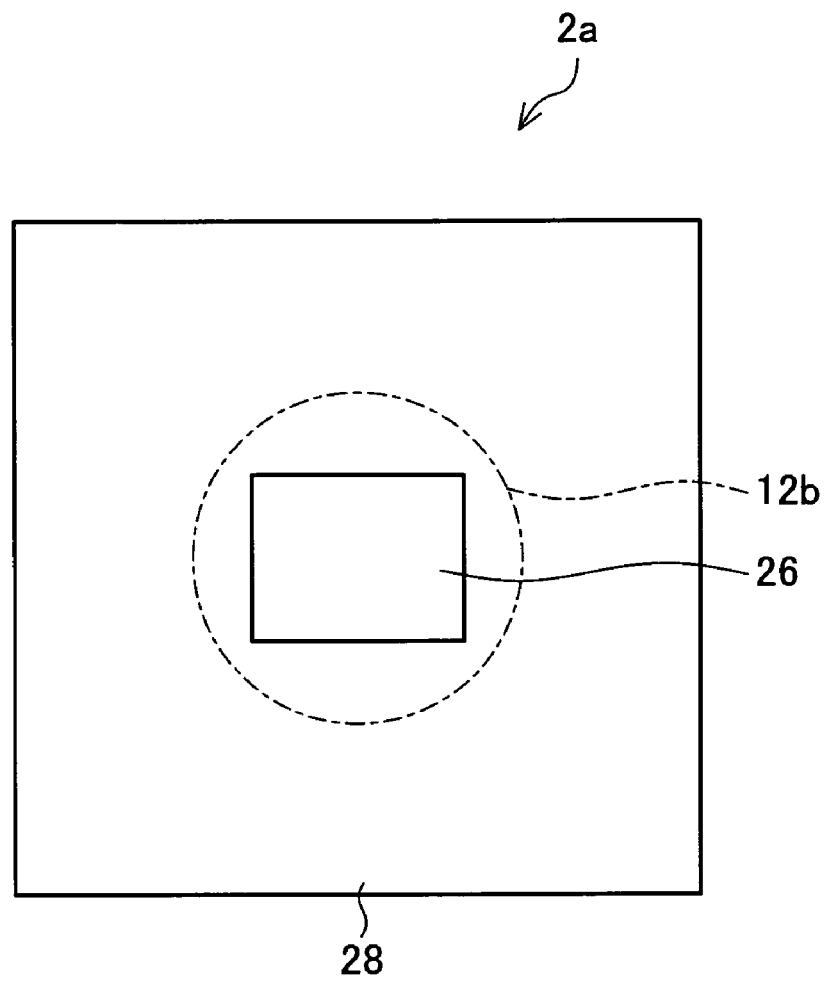
FIG. 5 is a top view of a lens unit of the camera module shown in FIG. 1.

The sealing section 28 seals each member stacked on the circuit board 21 with mold resin (sealing resin), thereby fixedly holding each member. The sealing section 28 seals each member stacked on the circuit board 21 in such a manner that the light transmitting area of the camera module 100a is avoided. Therefore, the surface (top surface) of the transparent lid section 26 of the image sensing unit 2a is not sealed with the sealing section 28, and is exposed as illustrated in FIG. 5. Thus, light transmits to the receiving surface of the solid-state image sensor 24 through the transparent lid section 26. The height of the surface of the sealing section 28 is lower than that of the surface of the transparent lid section 26. Therefore, parts of the side surfaces of the transparent lid section 26 are also exposed from the sealing section 28.

The area indicated by the one-dot chain line in FIG. 5 is the area where the lens holder 12 (particularly the alignment section 12b) should be mounted on the image sensing unit 2a (mounting area). In the present embodiment, the transparent lid section 26 exposed from the sealing section 28 is engaged with the opening 12d provided on the bottom surface of the lens holder 12 (alignment section 12b). Therefore, the lens holder 12 is unmistakably assembled on the area indicated by the one-dot chain line in FIG. 5. In other words, the lens unit 1a and the image sensing unit 2a are aligned in high precision. As such, the lens unit 1a is unmistakably mounted on a specific position on the image sensing unit 2a. In addition, the lens unit 1a can be arranged so that the optical axis of the lens 11 is concentric to the optical center of the solid-state image sensor 24.

With the arrangement, the lens holder 12 of the optical unit is engaged with the exposed part of the transparent lid section 26 from the sealing section 28 of the image sensing unit, thus the optical unit and the image sensing unit are fixed detachable from each other. This allows easy attachment and detachment of the optical unit and the image sensing unit, and easy replacement of a broken unit.

It is possible to fix the lens unit 1a and the image sensing unit 2a in a detachable state, by engaging the transparent lid section 26 with the lens holder 12 (opening 12d). Therefore, even if one of the units breaks down after the optical unit 1a and the image sensing unit 2a are assembled, the broken unit can be easily replaced. Furthermore, the lens holder 12 is fixed to the image sensing unit 2a, thereby restricting the movement of the lens holder 12. Therefore, it is possible to move the position of the lens 11 by the position adjusting section without moving the lens holder 12. That is to say, the adjustment of the position of the lens 11 is possible provided that the position adjusting section is provided in the camera module 100a. This thus enables the downsizing of necessary arrangements in adjusting the position of the lens 11. This leads to the downsizing of the camera module 100a.

In the present embodiment, the whole outer edge of the exposed transparent lid section 26 is covered by the lens holder 12 due to the engaging of the transparent lid section 26 and the opening 12d. That is to say, the surroundings of the transparent lid section 26 are covered by the lens holder 12. Additionally, the bottom surface of the lens holder 12 and the surface of the sealing section 28 are in contact (plane contact) with each other. Therefore, leaking-in of unnecessary light from the outside is securely prevented.

The present embodiment contains the DSP 22 and the solid-state image sensor 24 in the same module, and the sealing section 28 seals each member stacked on the circuit board 21. That is to say, the camera module 100a is of a CSP (Chip Scale Package) structure. Thus, it is possible to downsize electronic apparatuses such as digital cameras and portable phones with a built-in camera, each of which installs the camera module 100a. In addition, the sealing section 28 seals the camera module 100a including all of the DSP 22, the solid-state image sensor 24, and the wires 27 which connect the terminals 21a with the DSP 22 and the solid-state image sensor 24. Therefore, the arrangement of the camera module 100a is suitable for microminiaturization and extreme reduction of thickness.

In addition, in the arrangement of the present embodiment, the transparent lid section 26 exposed from the sealing section 28 is a protruded section and the opening 12d provided to the lens holder 12 is a recess section in engaging the transparent lid section 26 with the lens holder 12. However, the engagement may be done in an opposite way.

In the camera module 100a, the surfaces of the joints 29 are also exposed from the sealing section 28, however is not illustrated in FIG. 5. Thus, the joints 12c of the lens unit 1a and the joints 29 of the image sensing unit 2a are in contact with each other and is electrically connected, due to the engaging of the transparent lid section 26 and the opening 12d.

<Image Sensing Operation of the Camera Module 100a>

The following description deals with an image sensing operation of the camera module 100a.

The camera module 100a performs capturing an image as follows. Firstly, light from the outside is guided to the receiving surface (image sensing surface) of the image sensing unit 2a, and a subject image is formed thereon. The subject image is converted to electric signals at the image sensing unit 2a. The image sensing unit 2a performs various processes (such as image processing) to the electric signals.

A principal feature of the camera module 100a of the present embodiment is the position adjustment of the lens 11. Conventional solid-state image sensing devices, when adjusting the lens position, move the lens holder which holds the lens, and not the lens itself. Therefore, the load on a position adjusting section is great when adjusting the lens position. The fine adjustment in lens position is thus extremely difficult, and the response speed when adjusting the lens position is also slow. Consequently, the electricity consumption required for adjusting the lens position increases in amount.

The camera module 100a of the present embodiment is provided with a position adjusting section which adjusts the position of the lens 11 (distance between the lens 11 and the solid-state image sensor 24) by moving the lens 11 itself by use of electromagnetic force. In addition, the position adjusting section moves the lens 11 independently of the lens holder 12. That is to say, the lens holder 12 has no involvement with the position adjustment of the lens 11. This makes the load (driving force) small on the position adjusting section when adjusting the lens position. Therefore, the fine adjustment of the position of the lens 11 is thus easily performed, and a high lens alignment precision is thus attained for the lens 11. Furthermore, this allows the response speed to increase when adjusting the lens position, as well as reducing the amount of electricity consumption required in the lens position adjustment. Because the alignment precision of the lens 11 is improved, it is possible to realize a high-speed and high precision focusing (automatic focusing function) and a zooming function. For example, the camera module 100a can focus at a distance in a range of 20 to 30 μm.

In the camera module 100a, the lens holder 12 is fixed to the image sensing unit 2a, due to the opening 12d provided on the lens holder 12 engaging with the transparent lid section 26. That is to say, the movement of the lens holder 12 is restricted when adjusting the position of the lens 11. Therefore, in the camera module 100a, the position of the lens 11 is changed whilst the lens holder 12 is not moved (in a state the lens holder 12 is fixed). In other words, it is not necessary for the camera module 100a to move the lens holder 12 as like in the conventional camera modules, in order to adjust the position of the lens 11, provided that the camera module 100a is provided with the position adjusting section. Thus, it is possible to realize the downsizing of the necessary arrangement for adjusting the position of the lens 11. This leads to the downsizing of the camera module 100a itself.

With the arrangement, the camera module 100a can adjust the position of the lens 11 by driving the lens 11 itself by the use of the electromagnetic force, whilst restricting the movement of the lens holder 12. Therefore, the arrangement is different to that of the conventional camera module, which adjusts the lens position by driving the lens holder (the whole lens unit).

More specifically, in the camera module 100a of the present embodiment, the position adjusting section is provided with the magnetic body 14 and the coil 15. Therefore, when electric current is supplied to the coil 15 via the joints 12c, the magnetic field generates from the coil 15. The magnetic body 14 is provided in the vicinity of the coil 15, thus the electromagnetic force acts between the magnetic body 14 and the coil 15. The camera module 100a adjusts the position of the lens 11 by the action (attraction) or the reaction (repulsion) of the electromagnetic force acting between the magnetic body 14 and the coil 15. The strength of the electromagnetic force (amount of the magnetic field) can be controlled by the amount of electric current supplied to the coil 15. The direction of the electromagnetic force (direction of the magnetic field) can be controlled by the direction of the electric current. Thus, the strength of the electromagnetic force is easily controlled. Therefore, it is possible to perform the fine adjustment of the lens position in further high precision.

In addition, in the camera module 100a, the position adjusting section is further provided with the elastic body 13. The elastic body 13 is coupled with the magnetic body 14, and holds the lens 11. Therefore, when the electromagnetic force acts between the magnetic body 14 and the coil 15, the elastic body 13 coupled with the magnetic body 14 expands and contracts in association with the electromagnetic force. As a result, the lens 11 held by the elastic body 13 moves vertically on the optical axis to a position where the electromagnetic force acting between the magnetic body 14 and the coil 15 and the elastic force (spring stress) of the elastic body 13 are proportional. The elastic force of the elastic body 13 is determined depending on the materials and the like of the elastic body 13, thus it is possible to determine the elastic force beforehand. Therefore, the electromagnetic force can be controlled depending on the elastic force. The electromagnetic force is controllable from the amount of electric current supplied to the coil 15. The amount of electric current supplied to the coil 15 is controlled by outer signals (electric signals from outside). Therefore, the amount of movement by the lens 11 is easily controlled.

Figure 6A:
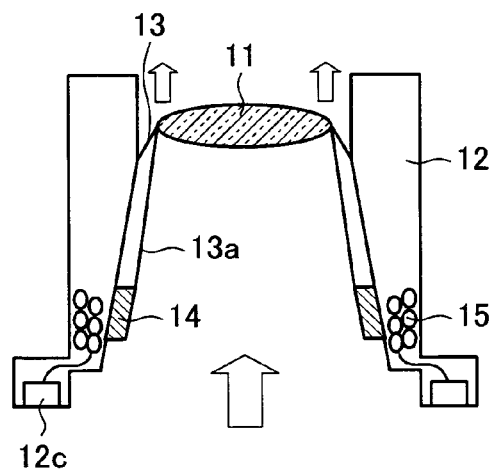
FIG. 6(a) is a cross sectional view illustrating a state where electromagnetic force in a direction of repulsion acts between a magnetic body and a coil in the camera module shown in FIG. 1.
Figure 6B:
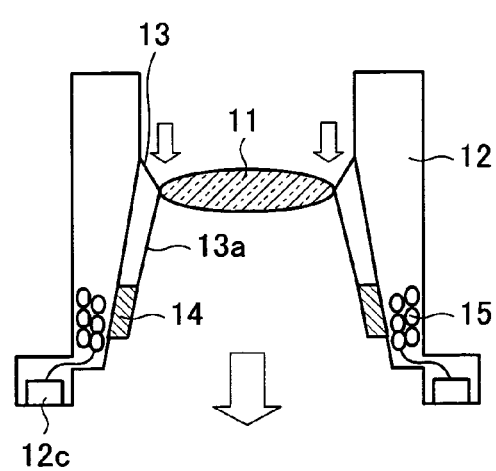
FIG. 6(b) is a cross sectional view illustrating a state where electromagnetic force in a direction of attraction acts between a magnetic body and a coil in the camera module shown in FIG. 1.

The following is a description in relation to the aforementioned position adjustment of the lens 11, describing the position adjustment of the lens 11 in the camera module 100a with reference to FIGS. 2, 6(a) and 6(b). FIG. 2 is a cross sectional view illustrating the state where no electromagnetic force acts on the magnetic body 14. FIG. 6(a) is a cross sectional view illustrating the state where the electromagnetic force acts between the magnetic body 14 and the coil 15 in a direction of repulsion. FIG. 6(b) is a cross sectional view illustrating the state where the electromagnetic force acts between the magnetic body 14 and the coil 15 in a direction of attraction.

In a normal state where electric current is not supplied to the coil 15, as shown in FIG. 2, the elastic body 13 is not expanded or contracted.

When the electromagnetic force acts between the magnetic body 14 and the coil 15 in a direction of repulsion (upwards), as shown in FIG. 6(a), the elastic body 13 expands upwards as shown by the arrow, accompanying the separating movement of the magnetic body 14 from the coil 15. As a result, the lens 11 separates from the image sensing unit 2a (solid-state image sensor 24), moving in an upward direction in response to the normal state. Thus, it is possible to extend the focal length. The focal length is the distance from the center of the lens 11 to the receiving surface of the solid-state image sensor 24.

When the electromagnetic force acts between the magnetic body 14 and the coil 15 in a direction of attraction (downwards), as shown in FIG. 6(b), the elastic body 13 contracts downwards as shown by the arrow, accompanying the approaching movement of the magnetic body 14 to the coil 15. As a result, the lens 11 approaches the image sensing unit 2a (solid-state image sensor 24), moving in a downward direction in response to the normal state. Thus, it is possible to shorten the focal length.

With the arrangement, the position of the lens 11 is adjusted by moving the lens 11, independently of the lens holder 12, by use of the electromagnetic force. The direction and the amount of the electromagnetic action on the magnetic body 14 can be altered by the direction and amount of the electric current supplied to the coil 15. Thus, the fine adjustment of the position of the lens 11 is easily performed. In addition, the magnetic body 14 and the coil 15 directly drive the lens 11, thereby simplifying the arrangement of the position adjusting section which adjusts the position of the lens 11. Therefore, it is possible to reduce the weight of the camera module 100a, and to improve the response and precision in focusing of the lens 11.

The camera module 100a can be manufactured by first separately manufacturing the lens unit 1a and the image sensing unit 2a, then combining the two together. More specifically, for example, the lens holder 12 is first manufactured for the lens unit 1a. The lens holder 12 is manufactured by resin molding. When resin molding, joints are formed on the bottom surface of the lens holder 12 (bottom surface of the alignment section 12b), and the coil 15 is buried in the lens holder 12. The coil 15 is to be connected to the joints 12c. Following this, the elastic body 13 and the magnetic body 14 are formed in the internal surface section of the lens holder 12. The elastic body 13 holds the lens 11, and the magnetic body 14 is coupled with the elastic body retainer 13a which holds the elastic body 13. As thus, the lens unit 1a is formed. The lens unit 1a may be formed by adhering, thermally adhering, or integrally molding each members constructing the lens unit 1a.

The image sensing unit 2a can be manufactured for example by the following method. The DSP 22 is adhered on the circuit board 21. Following this, the spacer 23 and the solid-state image sensor 24 are stacked on the DSP 22 in this order. The bonding pad (not illustrated) of the DSP 22 and the terminals 21a of the circuit board 21 are electrically connected via the wires 27. The terminals 21a are then connected to the joints 29.

The camera module 100a may be manufactured by combining the lens unit 1a and the image sensing unit 2a, each of which are manufactured in the aforementioned method. The alignment of the lens unit 1a and the image sensing unit 2a is performed by the alignment section 12b of the lens holder 12 and the surface of the transparent lid section 26 (surface exposed from the sealing section 28).

The following description deals with another arrangement example of the camera module 100a.

ANOTHER ARRANGEMENT EXAMPLE 1

Figure 7:
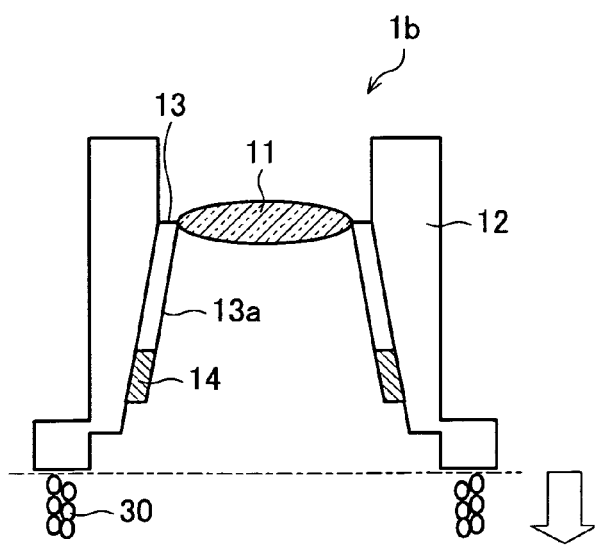
FIG. 7 is a cross sectional view illustrating another lens unit in the present invention.
Figure 8A:
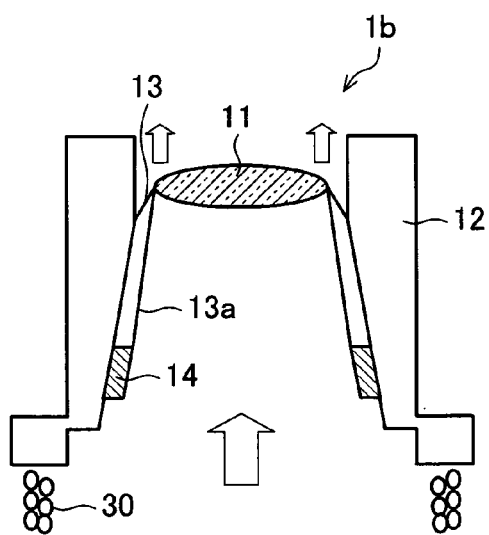
FIG. 8(a) is a cross sectional view illustrating a state where electromagnetic force in a direction of repulsion acts between a magnetic body and a coil in the lens unit shown in FIG. 7.
Figure 8B:
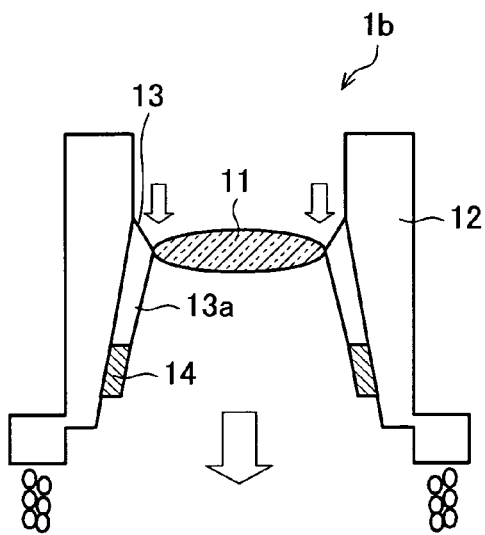
FIG. 8(b) is a cross sectional view illustrating a state where electromagnetic force in a direction of attraction acts between a magnetic body and a coil in the lens unit shown in FIG. 7.

The following description explains another arrangement example 1 with reference to FIGS. 7, 8(a) and 8(b). FIG. 7 is a cross sectional view illustrating a lens unit 1b and a coil 30. FIG. 8(a) is a cross sectional view illustrating a state where electromagnetic force acts between a magnetic body 14 and the coil 30 in a direction of repulsion in the arrangement shown in FIG. 7. FIG. 8(b) is a cross sectional view illustrating a state where the electromagnetic force acts between the magnetic body 14 and the coil 30 in a direction of attraction in the arrangement shown in FIG. 7.

In the arrangement shown in FIG. 2, the coil 15 is provided inside the lens unit 1a (lens holder 12). However, as shown in FIGS. 7, 8(a) and 8(b), the coil 30 may be provided outside the lens unit 1b (for example, the aforementioned image sensing unit 2a).

The lens unit 1b as illustrated in FIG. 7 is an arrangement of which the coil 15 and the joints 12c are omitted from the lens unit 1a shown in FIG. 2. Instead, in the arrangement of FIG. 7, the coil 30 is provided outside the lens unit 1b. The one-dot chain line in FIG. 7 indicates the border of the lens unit 1b and the coil 30.

In the arrangement of FIG. 7 also, the coil 30 is provided in the vicinity of the magnetic body 14. Therefore, the magnetic field generating from the coil 30 acts on the magnetic body 14. Consequently, the position of the lens 11 is adjusted by the use of the electromagnetic force, as similar to FIGS. 6(a) and 6(b). That is to say, in the arrangement of FIG. 7, when the electromagnetic force acts between the magnetic body 14 and the coil 30 in a direction of repulsion, the lens 11 moves upwards in response to the normal state as shown in FIG. 8(a), thereby extending the focal length. On the other hand, when the electromagnetic force acts between the magnetic body 14 and the coil 30 in a direction of attraction, the lens 11 moves downwards in response to the normal state, thereby shortening the focal length.

With the arrangement, the lens holder 12 does not require the coil 15 and the joints 12c, provided that the coil 30 is provided on the outside of the lens unit 1b (for example, the image sensing unit 2a). The arrangement of the lens unit 1b is thus simplified. Thus, the lens holder 12 is easily manufactured. In addition, the arrangement of FIG. 6 requires a wiring (joints 12c) to supply electric current to the coil 15, however the arrangement of FIG. 7 does not require such wiring.

ANOTHER ARRANGEMENT EXAMPLE 2

Figure 9:
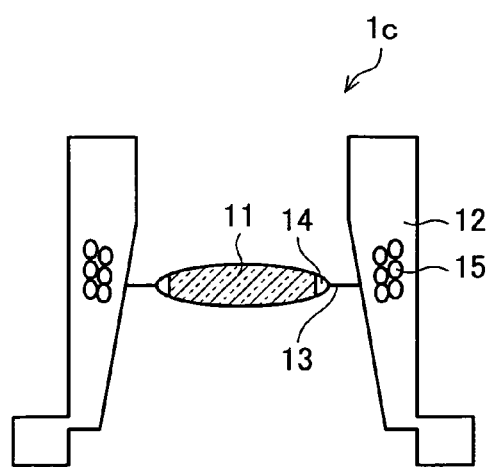
FIG. 9 is a cross sectional view of yet another lens unit in the present invention.
Figure 10:
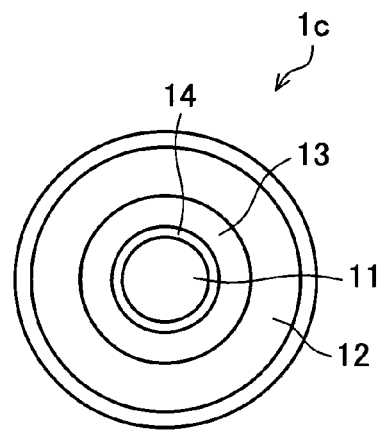
FIG. 10 is a top view of the lens unit shown in FIG. 9.
Figure 11A:
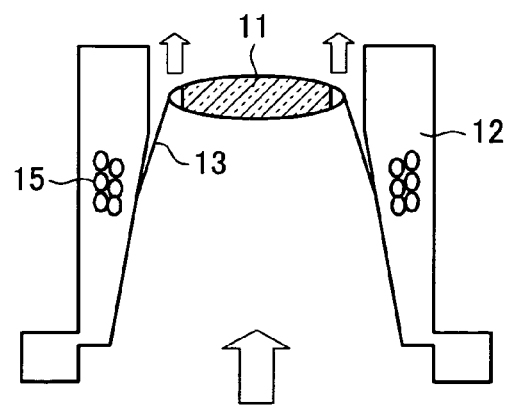
FIG. 11(a) is a cross sectional view illustrating a state where electromagnetic force in a direction of repulsion acts between a magnetic body and a coil in the lens unit shown in FIG. 9.
Figure 11B:
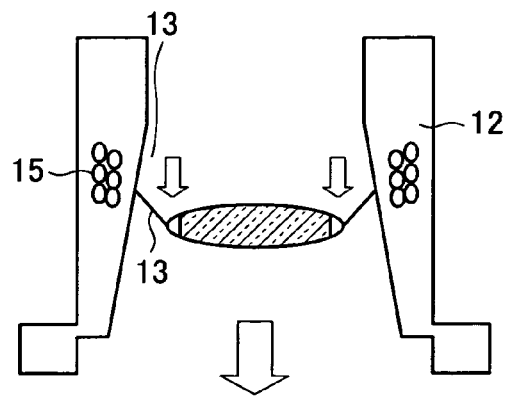
FIG. 11(b) is a cross sectional view illustrating a state where electromagnetic force in a direction of attraction acts between a magnetic body and a coil in the lens unit shown in FIG. 9.

The following description explains another arrangement example 2 with reference to FIGS. 9, 10, 11(a) and 11(b). FIG. 9 is a cross sectional view of a lens unit 1c. In the lens unit 1c, the lens 11 is held by the magnetic body 14. FIG. 10 is a top view of the lens unit 1c. FIG. 11(a) is a cross sectional view illustrating the state where the electromagnetic force acts between the magnetic body 14 and the coil 15 in a direction of repulsion, in the arrangement of FIG. 9. FIG. 11(b) is a cross sectional view illustrating a state where the electromagnetic force acts between the magnetic body 14 and the coil 15 in a direction of attraction, in the arrangement of FIG. 9.

In FIGS. 2 and 6, the elastic body 13 holds the lens 11. However, the lens 11 may be held by the magnetic body 14, as shown in FIGS. 9, 10, 11(a) and 11(b).

The elastic body 13 is coupled with the magnetic body 14 via the elastic body retainer 13a in FIGS. 2 and 6. However, the elastic body 13 may be coupled directly with the magnetic body 14, not via the elastic body retainer 13a. That is to say, the elastic body 13 and the magnetic body 14 may be integral. Thus, the arrangement of the position adjusting section is simplified. This makes it possible to realize the reduction in weight and costs of the camera module.

In the lens unit 1c, the ring-shaped magnetic body 14 is embedded in the periphery (outer edge) of the lens 11, as illustrated in FIG. 9. This magnetic body 14 is held by the elastic body 13. The elastic body 13 is of a ring-shape, and holds the magnetic body 14 by the inner circumference thereof. The external circumference of the elastic body 13 is fixed to the internal side surface of the lens holder 12. The elastic body retainer 13a (see FIG. 2) to hold the elastic body 13 is unnecessary in the lens unit 1c. Therefore, it is possible to simplify and reduce the weight of the arrangement of the position adjusting section of the lens 11 (automatic focusing mechanism).

In the lens unit 1c, the coil 15 is buried inside the lens holder 12 in the vicinity of the magnetic body 14, as similar to the lens unit 1a. Therefore, it is possible to realize the downsizing and the reduction of weight of the position adjusting section. Furthermore, the lens 11 can be moved with a small magnetic force. This thus allows reduction of electric current consumption, as well as reduction of leaking of magnetic force.

The lens unit 1c has an arrangement having the lens 11 as the center, and in the order from center to periphery, the magnetic body 14, the elastic body 13, and the lens holder 12 are positioned, as illustrated in the top view of FIG. 10.

The following description deals with the focus adjustment in the lens unit 1c with reference to FIGS. 9, 11(a) and 11(b). In a normal state where no electric current is supplied to the coil 15, the elastic body 13 is horizontal as shown in FIG. 9. When the electric force acts between the magnetic body 14 and the coil 15 in a direction of repulsion, the elastic body 13 expands in a direction separating from the coil 15, as shown in FIG. 11(a). As a result, the lens moves upwards in response to the normal state. This thus allows to extend the focal length. On the other hand, when the electromagnetic force acts between the magnetic body 14 and the coil 15 in a direction of attraction, the elastic body 13 expands in a direction approaching the coil 15, as shown in FIG. 11(b). As a result, the lens 11 moves downwards in response to the normal state. This thus allows to shorten the focal length.

The movement of the lens 11 stops where the elastic force of the elastic body 13 and the electromagnetic force are proportional. That is to say, the position of the lens 11 is changeable to the position where the elastic force and the electromagnetic force are proportional.

ANOTHER ARRANGEMENT EXAMPLE 3

Figure 12:
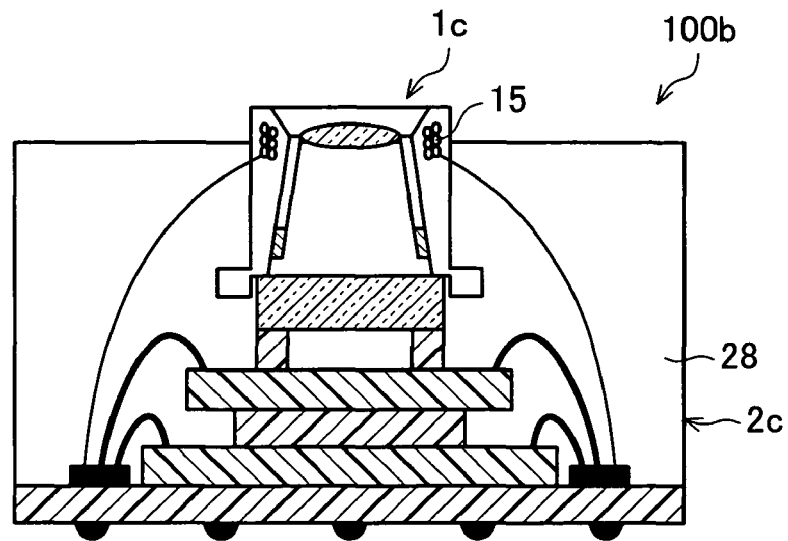
FIG. 12(a) is a cross sectional view of a camera module in which a lens unit 1c and an image sensing unit 2c are collectively sealed.
FIG. 12(b) is a top view of the camera module shown in FIG. 12(a).
Figure 12:
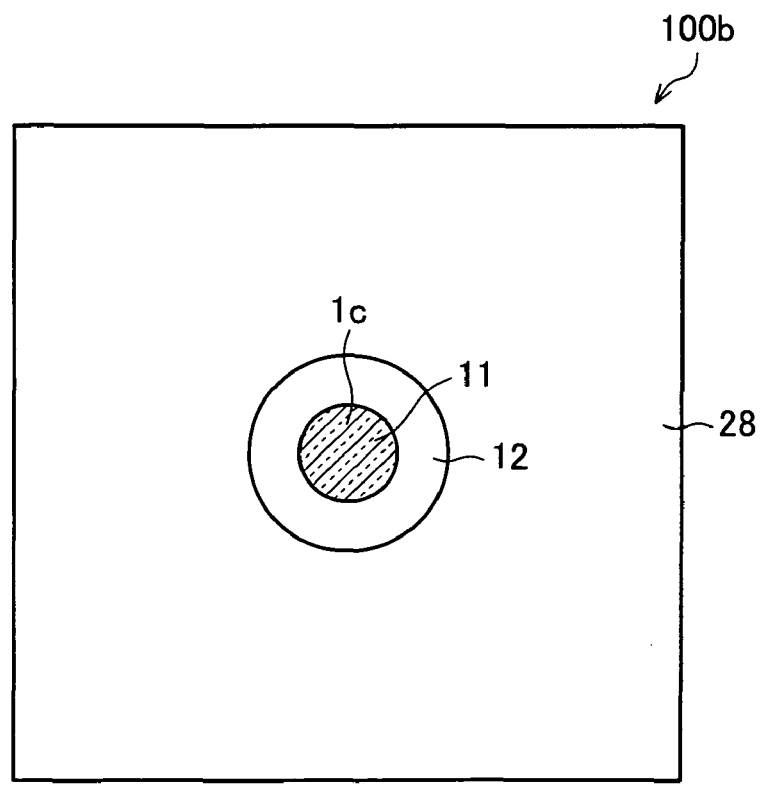

FIGS. 12(a) and 12(b) are cross sectional views of a camera module 100b. In these drawings, the lens unit 1c and an image sensing unit 2c are arranged integrally in the camera module 100b. A sealing section 28 collectively seals the lens unit 1c and the image sensing unit 2c with resin. In other words, in the camera module 10b, the sealing section 28 seals the lens unit 1c as well as the image sensing unit 2c. Except that the lens unit 1c and the image sensing unit 2c are collectively sealed by the sealing section 28, the camera module 100b has the same arrangement as the camera module 100a shown in FIG. 1.

In an arrangement as like the camera module 100b shown in FIGS. 12(a) and 12(b) where the sealing section 28 collectively seals the lens unit 1c and the image sensing unit 2c, the lens unit 1c and the image sensing unit 2c do not separate even if shock or the like is received. Therefore, it is advantageous that shock-resistance and environmental-resistance are improved.

"Shock-resistance" indicates the decrease in failure rate, caused by dropping the camera module 100b, or the camera module 100b receiving shock or vibration. Particularly, breakage of packaging is less likely to occur in the camera module 100b.

"Environmental-resistance" indicates that penetration of moisture (water), dust, chemical substances, aggressive gas and the like are prevented when storing, using or doing any other operation with the camera module 10*b*.

ANOTHER ARRANGEMENT EXAMPLE 4

Figure 13A:
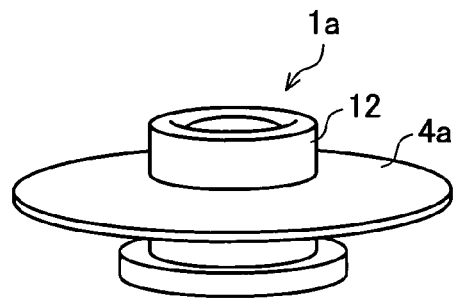
FIG. 13(a) is a perspective view illustrating a pressing member fixed to a lens holder.
Figure 13B:
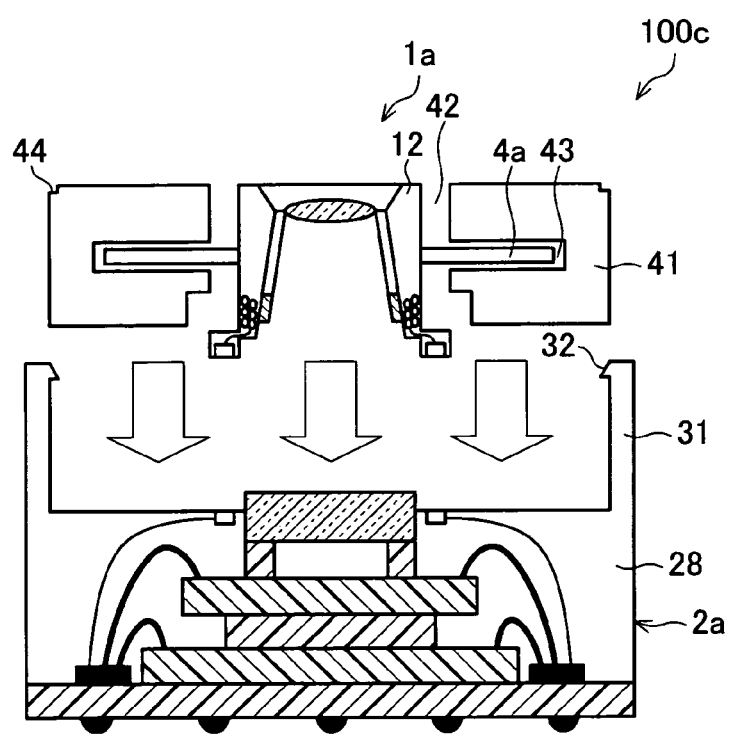
FIG. 13(b) is a cross sectional view illustrating a camera module which fixes a lens unit and an image sensing unit by using the pressing member shown in FIG. 13(a).
Figure 13C:
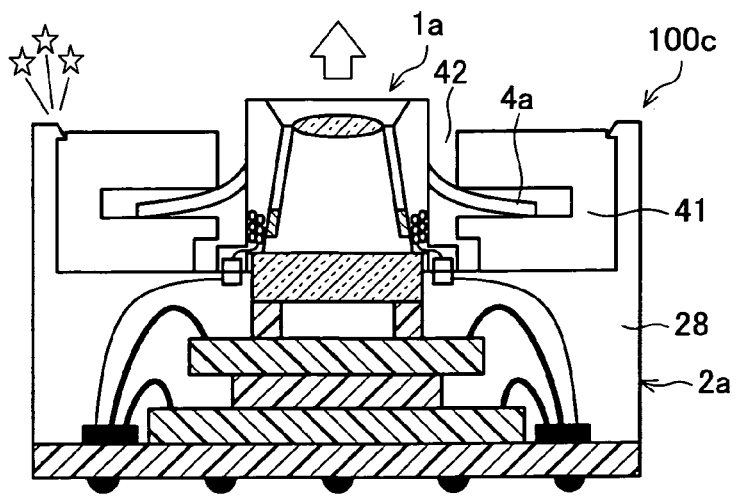
FIG. 13(c) is a cross sectional view illustrating a camera module which fixes a lens unit and an image sensing unit by using the pressing member shown in FIG. 13(a).

The following description deals with an arrangement where a pressing member 4*a* as like the one illustrated in FIG. 13(*a*) firmly fixes the lens unit 1*a* and the image sensing unit 2*a*. FIG. 13(*a*) is a perspective view illustrating the pressing member 4*a* fixed on the lens holder 12. FIGS. 13(*b*) and 13(*c*) are cross sectional views illustrating the state where the lens unit 1*a* and the image sensing unit 2*a* are fixed by the pressing member 4*a*.

In a substantially mid of periphery side of the lens holder 12, a disc-shaped pressing member 4*a* is fixed, as shown in FIG. 13(*a*). The lens unit 1*a*, as illustrated in FIGS. 13(*b*) and 13(*c*), includes a supporting section 41 which supports the lens 12 via the pressing member 4*a*. The shape of the supporting section is a substantially parallelepiped rectangular shape, and the size of the top surface and the bottom surface is made substantially equal to the top surface and bottom surface of the image sensing unit 2*a*. A through-hole 42 which vertically penetrates the supporting section 41 is provided in the supporting section 41. The diameter of the through-hole 42 is larger than the diameter of the lens holder 12. A groove 43 is provided on the substantially mid of the internal surface of the through-hole 42. The groove 43 has a larger diameter than the diameter of the lens holder 12. The pressing member 4*a* fixed to the lens holder 12 is inserted into this groove 43. Thus, the lens holder 12 is supported by the pressing member 4*a* inserted into the groove 43 of the supporting section 41. The groove 43 is provided slightly larger than the pressing member 4*a*, therefore the lens holder and the pressing member 4*a* are movable inside the groove 43, in the axis direction of the groove 43 and the horizontal direction orthogonal to the axis.

A claw engaging section 44 is provided on the substantially mid of the outer edge part of the supporting section 41 (substantially mid of the side on the surface of the supporting section 41 which face each other). The claw engaging section 44 is a rectangular groove provided on the outer edge section of the supporting section 41 in a vertical direction. The sealing section 28 of the image sensing unit 2*a* is arranged such that the arm section 31 and the claw section 32 rise upwardly. The claw engaging section 44 engages with this arm section 31 and claw section 32. Thus, the lens unit 1*a* and the image sensing unit 2*a* are fixed. The top end part of the claw engaging section 44 has the groove formed slightly deep, in order to engage the claw 32. The claw 32 is provided on the tip of the sealing section 28 of the image sensing unit 2*a*.

Thus, as illustrated in FIG. 13(*c*), the lens unit 1*a* and the image sensing unit 2*a* are engaged together by the claw engaging section 44 of the lens unit 1*a* and the arm section 31 and the claw section 32 of the sealing section 28 of the image sensing unit 2*a*. More specifically, the components are fixed such that the top surface of the sealing section 28 of the image sensing unit 2*a* is in contact with the bottom surface (back surface) of the supporting section 41 of the lens unit 1*a*. Meanwhile, the whole outer edge of the transparent lid section 26 exposed from the sealing section 28 is covered by the lens holder 12, due to the engaging of the transparent lid section 26 with the opening 12*d* of the lens holder 12. That is to say, the surrounding of the transparent lid section 26 is covered by the lens holder 12. The relative position of the lens holder 12 and the transparent lid section 26 are fixed by thus having the bottom surface of the lens holder 12 and the surface of the sealing section 28 in contact (plane contact) with each other. Meanwhile, the top end part of the lens holder 12 protrudes from the through-hole 42. On the other hand, the pressing member 4*a* is fixed in a position higher than the groove 43 provided on the supporting section 41. The lens holder 12 is thus pushed in a downward direction by the pressing member 4*a*, whereby the lens holder is firmly fixed to the transparent lid section 26.

As such, in the camera module 100*c* in FIG. 13(*c*), the lens unit 1*a* includes the pressing member 4*a* fixed to the lens holder 12 and the supporting section 41 which supports the pressing member 4*a*. The pressing member 4*a* presses the lens holder 12 to the transparent lid section 26 when the lens unit 1*a* and the image sensing unit 2*a* are fixed together, and the bottom surface of the lens holder is in contact with the surface of the sealing section 28. Thus, it is possible to firmly fix the lens unit 1*a* and the image sensing unit 2*a*. Furthermore, the pressing unit 4*a* absorbs shock from the outside, thereby protecting the camera module 100*c* from shock.

The pressing member 4*a* shown in FIG. 13(*a*) may be constructed by a plate spring, a washer, and other components which have no opening, as well as a gland packing and the like as illustrated in FIG. 13(*c*). In case a pressing member 4*a* which has no opening is used, leaking-in of unnecessary light to the solid-state image sensor 24 from the outside is securely prevented by the pressing member 4*a*.

Figure 14A:
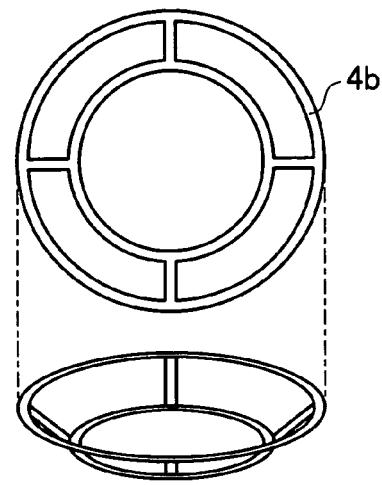
FIG. 14(a) is a top view and a perspective view illustrating another pressing member.
Figure 14B:
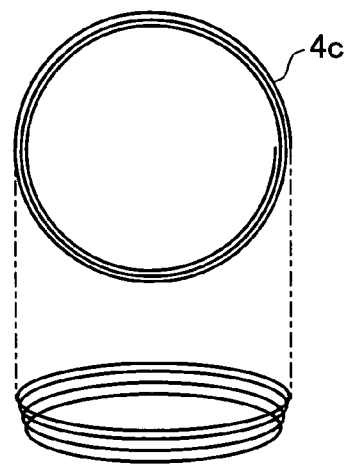
FIG. 14(b) is a top view and a perspective view illustrating another pressing member.
Figure 14C:
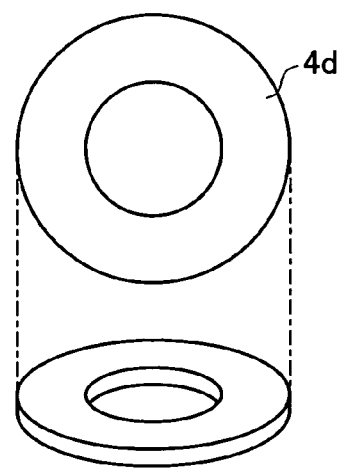
FIG. 14(c) is a top view and a perspective view illustrating another pressing member.

On the other hand, the whole outer edge of the transparent lid section 26 exposed from the sealing section 28 is fully covered with the lens holder 12, and the bottom surface of the lens holder 12 and the surface of the sealing section 28 are in contact (plane contact) with each other. With such arrangement, unnecessary light from the outside cannot leak into the solid-state image sensor 24. Therefore, a pressing member 4*b* which has an opening as shown in FIG. 14(*a*), or a spiral-shaped pressing member 4*c* as shown in FIG. 14(*b*) may be used. As such, there are no restrictions in the arrangement and material of the pressing member.

Figure 15A:
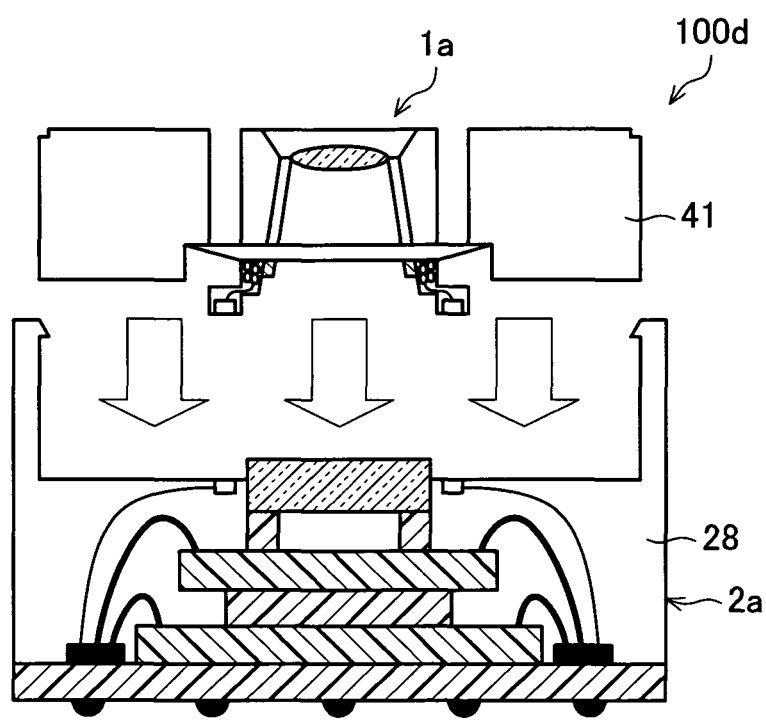
FIG. 15(a) is a cross sectional view illustrating another camera module which fixes a lens unit and an image sensing unit by using a pressing member.
Figure 15B:
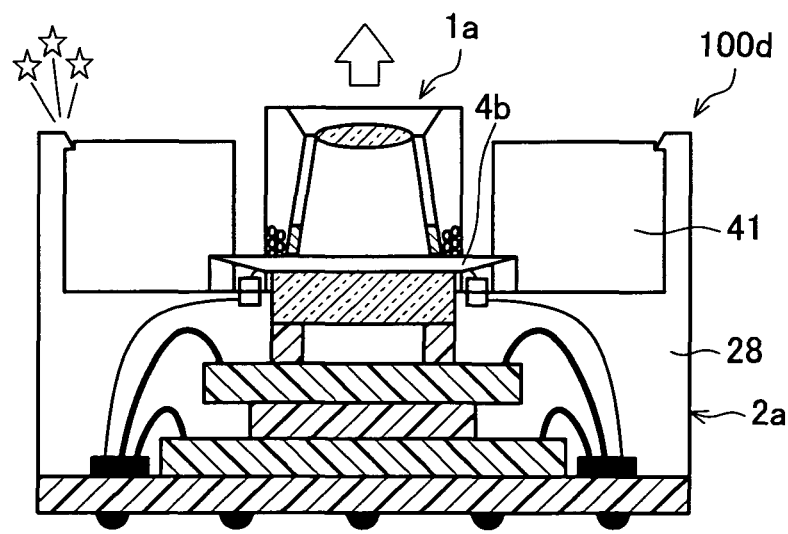
FIG. 15(b) is a cross sectional view illustrating another camera module which fixes a lens unit and an image sensing unit by using a pressing member.
Figure 16:
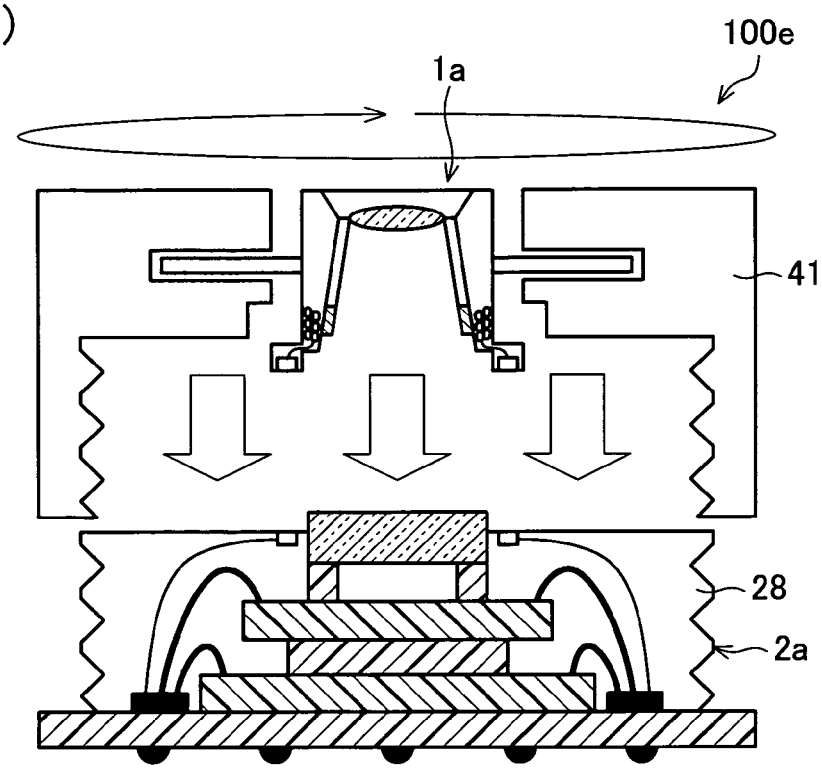
FIG. 16(a) is a cross sectional view illustrating yet another camera module which fixes a lens unit and an image sensing unit by using a pressing member.
FIG. 16(b) is a cross sectional view illustrating yet another camera module which fixes a lens unit and an image sensing unit by using a pressing member.
Figure 16:
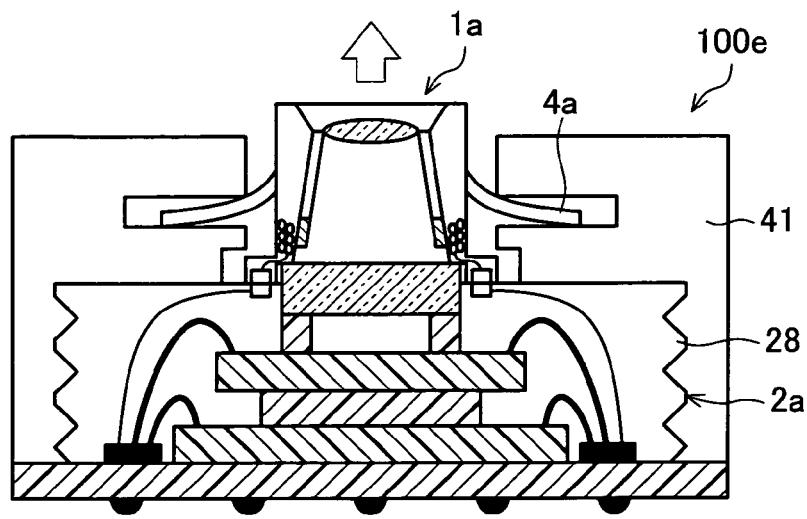

FIGS. 15(*a*) and 15(*b*) are cross sectional views of a camera module 100*d*. The camera module 100*d* has the same arrangement as FIGS. 13(*b*) and 13(*c*), however the pressing member 4*a* is replaced with a pressing member 4*b* as shown in FIG. 14(*a*). FIGS. 16(*a*) and 16(*b*) are cross sectional views of a camera module 100*e*. The camera module 100*e* has the same arrangement as FIGS. 13(*b*) and 13(*c*), however the lens unit 1*a* and the image sensing unit 2*a* are fixed by a screw fixing method, fixing the supporting section 41 and the sealing section 28 by a screw. The same effects as the arrangements of FIGS. 13(*b*) and 13(*c*) are attained in these arrangements.

Figure 17A:
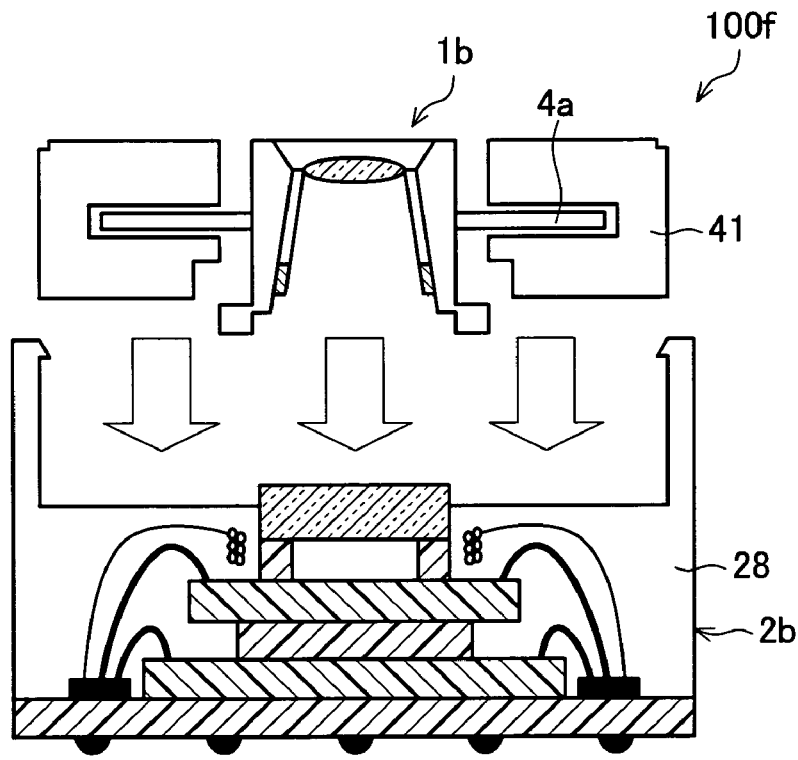
FIG. 17(a) is a cross sectional view illustrating yet another camera module which fixes a lens unit and an image sensing unit by using a pressing member.
Figure 17B:
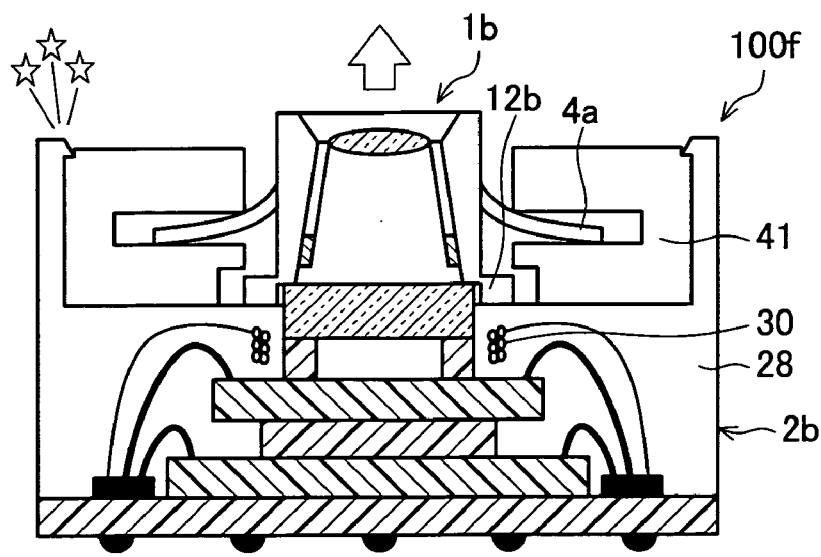
FIG. 17(b) is a cross sectional view illustrating yet another camera module which fixes a lens unit and an image sensing unit by using a pressing member.
Figure 18A:
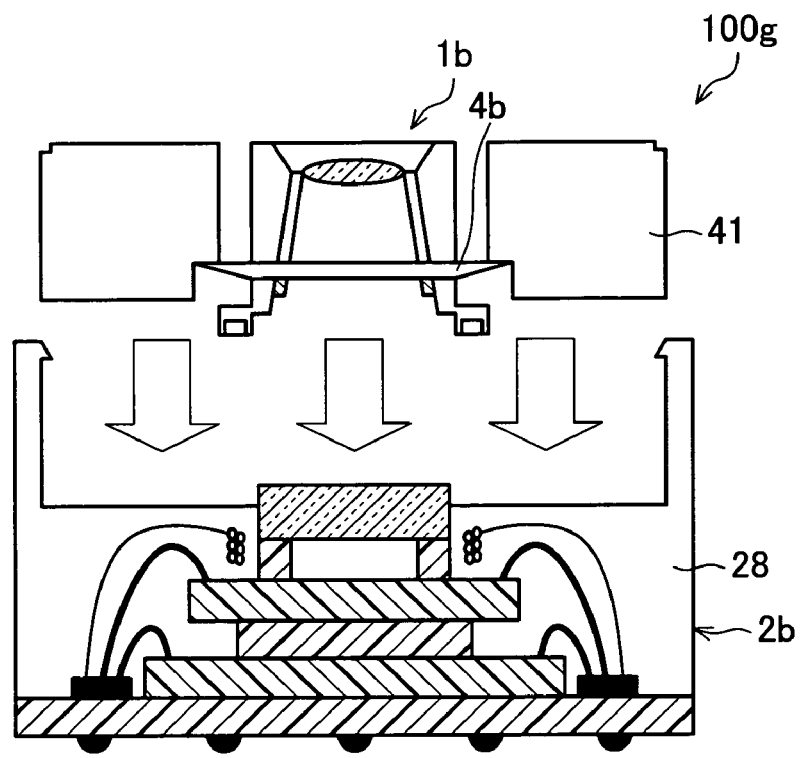
FIG. 18(a) is a cross sectional view illustrating yet another camera module which fixes a lens unit and an image sensing unit by using a pressing member.
Figure 18B:
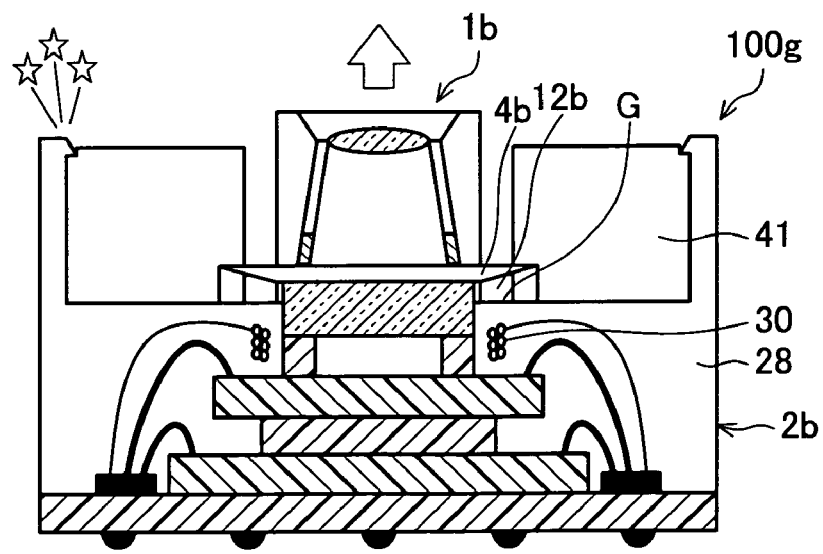
FIG. 18(b) is a cross sectional view illustrating yet another camera module which fixes a lens unit and an image sensing unit by using a pressing member.
Figure 19A:
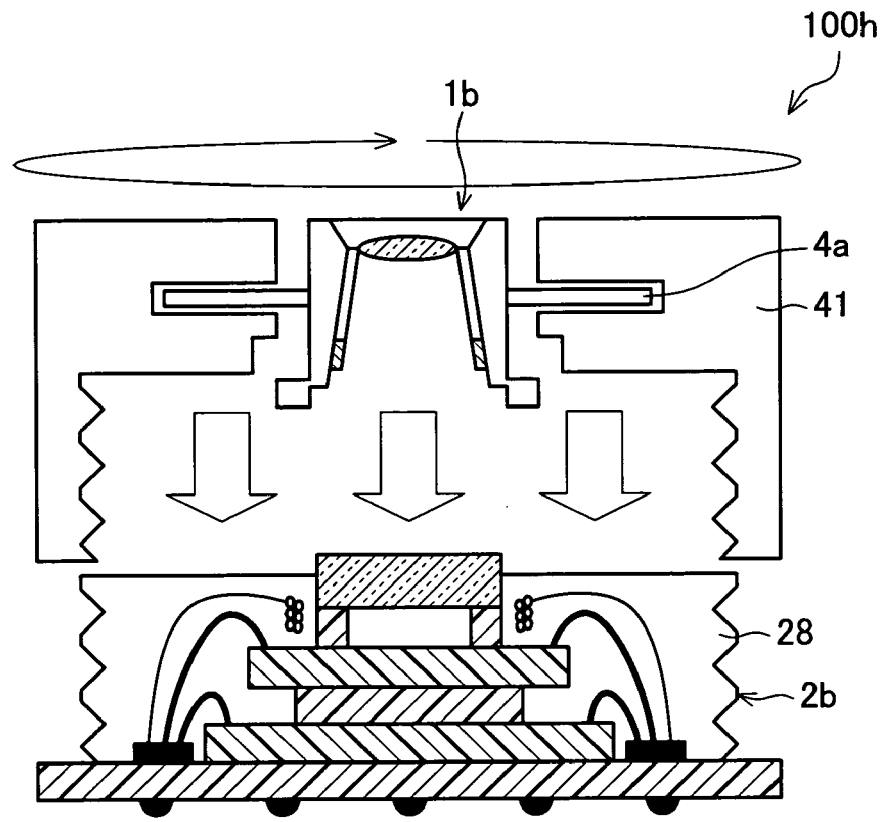
FIG. 19(a) is a cross sectional view illustrating yet another camera module which fixes a lens unit and an image sensing unit by using a pressing member.
Figure 19B:
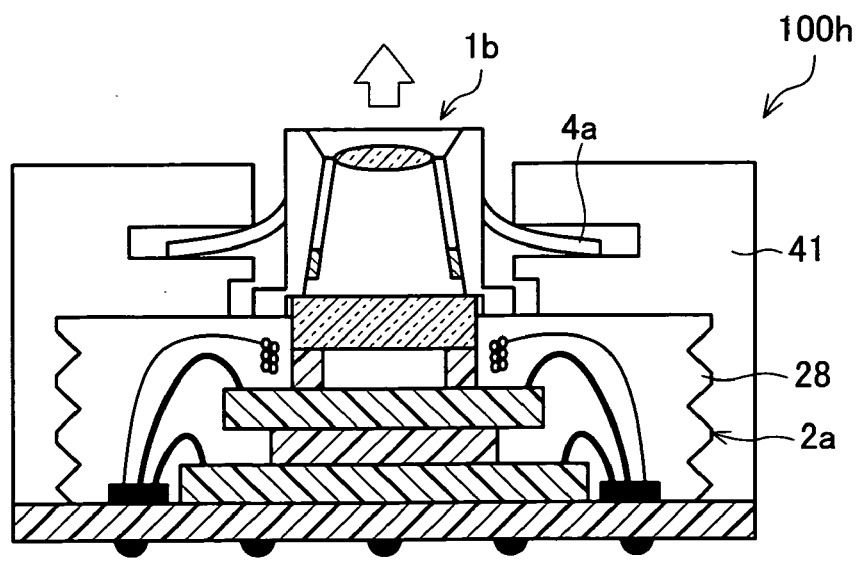
FIG. 19(b) is a cross sectional view illustrating yet another camera module which fixes a lens unit and an image sensing unit by using a pressing member.
Figure 20:
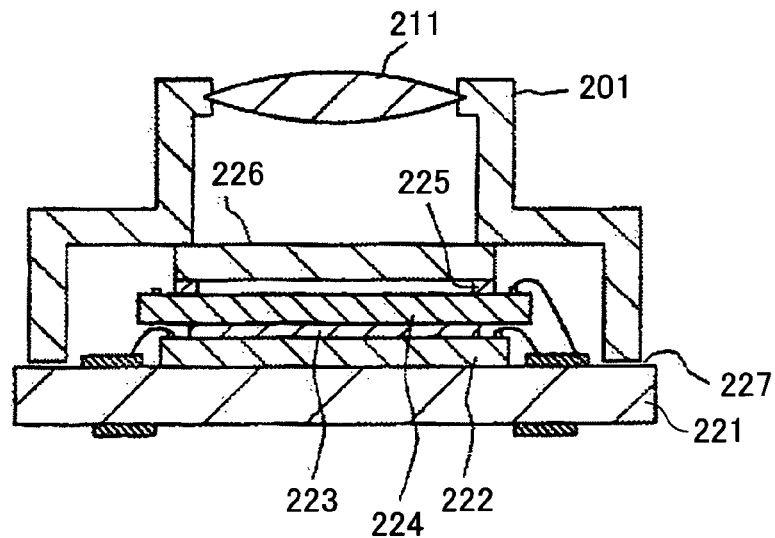
FIG. 20 is a cross sectional view of a camera module described in Patent Document 1.
Figure 21:
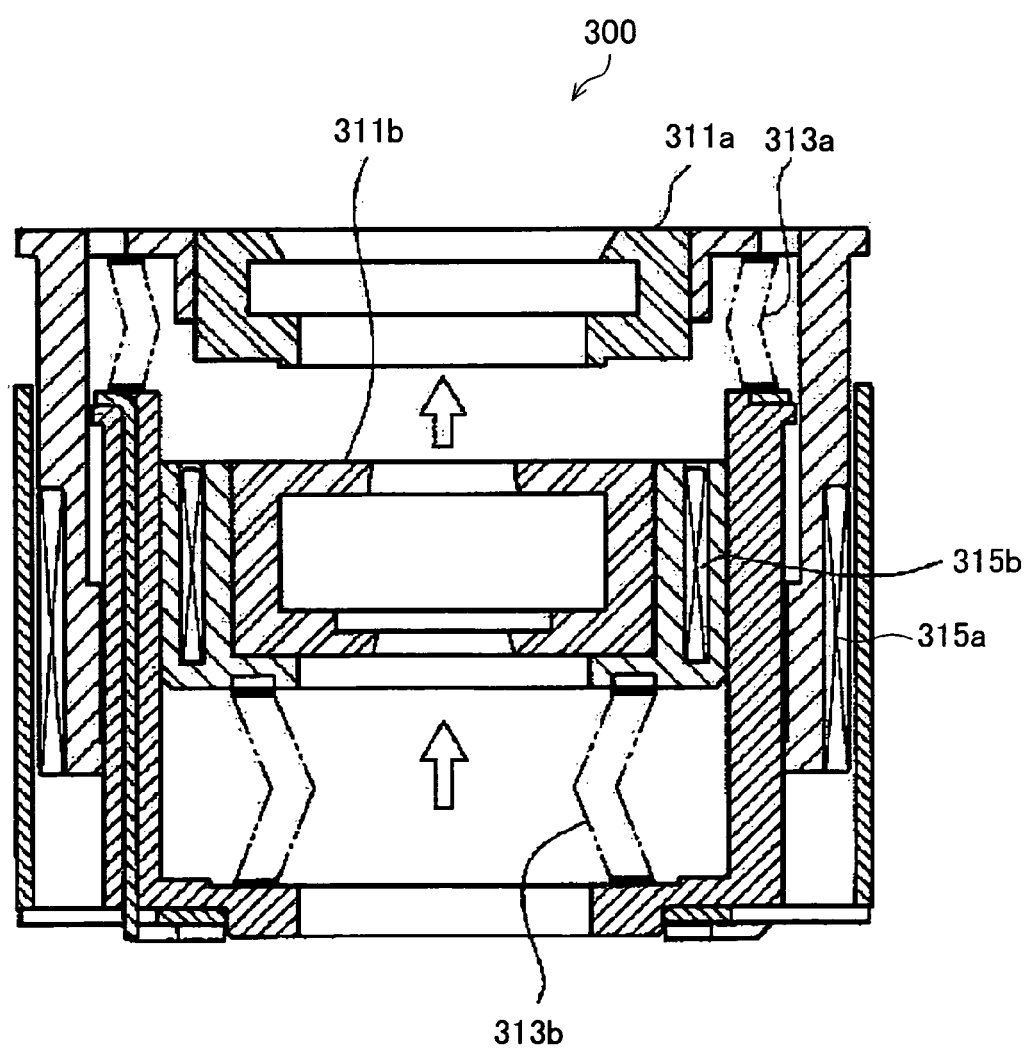
FIG. 21 is a cross sectional view of a camera module described in Patent Document 2.

FIGS. 17(*a*) and 17(*b*) are cross sectional views of a camera module 10*f*. The camera module 100*f* has the same arrangement as FIGS. 13(*b*) and 13(*c*), however the lens unit 1*a* and the image sensing unit 2*a* are replaced by the lens unit 1*b* and an image sensing unit 2*b*, respectively. FIGS. 18(*a*) and 18(*b*) are cross sectional views of a camera module 100*g*. The camera module 100*g* has the same arrangement as FIGS. 17(*a*) and 17(*b*), however the pressing member 4*a* is replaced with the pressing member 4*b*. FIGS. 19(*a*) and 19(*b*) are cross sectional views of a camera module 100*h*. The camera module 100*h* has the same arrangement as that of FIGS. 16(*a*) and 16(*b*), however the lens unit 1*a* and the image sensing unit 2*a* are replaced with the lens unit 1*b* and the image sensing unit 2*b*, respectively. In addition, the camera module 100*h* fixes the supporting section 41 and the sealing section 28 by the screw fixing method. In each of these arrangements shown in FIGS. 17(*a*) through 19(*b*), the coil 30 is provided to the image sensing unit 2*b*. Therefore, these arrangements may thus have the bottom surface of the lens holder 12 (alignment section 12*b*) in contact with the sealing section 28 as shown in FIGS. 17(*b*) and 19(*b*), or have a space G, where the alignment section 12*b* is not in contact with the sealing section 28, as shown in FIG. 18(*b*). Even with these arrangements, the same effect is attained as those of FIGS. 13(*b*) and 13(*c*).

The positioning of the coil 15 for generating the magnetic field in the present invention is not particularly limited, provided that the position is set where the magnetic field acts on the magnetic body 14. Thus, the coil 15 may be provided to either one of the lens unit or the image sensing unit. It is also possible to transpose the position of the coil and the magnetic body, provided that the lens is movable, independently of the lens holder by the use of the electromagnetic force.

As the aforementioned, the solid-state image sensing device and the optical unit of the present invention includes a position adjusting section which adjusts the position of the lens by moving the lens, independently of the lens holder by use of the electromagnetic force. This makes the load small on the position adjusting section when adjusting the lens position. Therefore, the fine adjustment is easily performed, and a high lens alignment precision is thus attained. Furthermore, this allows the response speed to increase when adjusting the lens position, as well as reducing the amount of electricity consumption required in the lens position adjustment.

The solid-state image sensing device of the present invention is preferably arranged such that the position adjusting section includes a coil, a magnetic body, and an elastic body; and the position adjusting section adjusts the lens position by expanding and contracting the elastic body, due to the electromagnetic force which acts between the coil and the magnetic body.

According to the invention, the position adjusting section includes a coil, a magnetic body and an elastic body. When electric current is supplied to the coil, a magnetic field is generated. This magnetic field acts on the magnetic body. As a result, the electromagnetic force acts between the coil and the magnetic body. The elastic body expands and contracts by the action (attraction) or a reaction (repulsion) of the electromagnetic force. This allows the lens to move to a position where the electromagnetic force and the elastic force are proportional. The electromagnetic force is controllable by adjusting the amount of electric current flowed to the coil. The elastic force is a value unique to the elastic body. Therefore, the moving distance of the lens is easily controlled by adjusting the amount of electric current flowed to the coil, in response to the elastic force of the elastic body. Thus, it is possible to perform the fine adjustment of the lens position in high precision.

The solid-state image sensing device of the present invention may be arranged such that the coil or the magnetic body is provided to the lens holder, the elastic body is coupled with the coil or the magnetic body provided to the lens holder, and holds the lens.

According to the invention, the elastic body is coupled integrally with the coil or the magnetic body, either of which is provided to the lens holder. In other words, the coil or the magnetic body, either of which is connected to the lens holder, is connected to one end of the elastic body, and the lens is coupled to the other end of the elastic body. This elastic body holds the lens. Thus, arrangement of the position adjustment section is simplified. This realizes the reduction in weight and cost of the solid-state image sensing device.

In this arrangement, the coil or the magnetic body which is not coupled with the elastic body is preferably buried in the lens holder. For example, if the coil is buried in the lens holder, the coil is fixed. In this condition, the component which would move by the use of the electromagnetic force would be the magnetic body provided to the lens holder. That is to say, the position of one of either the magnetic body or the coil is fixed, and the position of the other one moves due to the electromagnetic force. This allows easy control of the lens in the amount of movement. Thus, it is possible to perform the fine adjustment of the lens position in higher precision.

In addition, the coil and the magnetic body may both be provided to the lens holder.

The solid-state image sensing device of the present invention may be arranged such that the optical unit and the image sensing unit are fixed detachable from each other.

According to the invention, the optical unit and the image sensing unit are fixed detachable from each other. Therefore, even if one of the units breaks down after the units have been assembled, the broken unit can be easily replaced.

The solid-state image sensing device of the present invention may be arranged such that the lens holder is fixed to the image sensing unit.

According to the invention, the lens holder is fixed detachable from the image sensing unit. This restricts the movement of the lens holder. Therefore, it is possible to move the lens position by the position adjusting section without moving the lens holder. That is to say, the adjustment of the lens position is possible provided that the solid-state image sensing device is provided with the position adjusting section. Thus, it is possible to realize downsizing of the necessary arrangement in adjusting the lens position. This leads to the downsizing of the solid-state image sensing device.

The solid-state image sensing device of the present invention may be arranged such that the image sensing unit includes a transparent lid section covering a receiving surface of the solid-state image sensor, and a sealing section sealing the image sensing unit in such a manner that the surface of the transparent lid section is exposed; and the lens holder and the exposed part of the transparent lid section are engaged with each other.

According to the invention, the optical unit and the image sensing unit are fixed detachable from each other, by the lens holder being engaged with an exposed part of a transparent lid section from resin. This allows easy attachment and detachment of the optical unit and the image sensing unit, and easy replacement of a broken unit.

The solid-state image sensing device of the present invention may be arranged such that a whole outer edge of the transparent lid section exposed from the sealing section is covered by the lens holder; and a bottom surface of the lens holder and a surface of the sealing resin is in contact with each other.

According to the present invention, the whole outer edge of the exposed transparent lid section is covered by the lens holder, due to the engaging of the lens holder with the transparent lid section. Furthermore, the bottom surface of the lens holder and the surface of the sealing section are in contact (plane contact) with each other. Therefore, leaking-in of unnecessary light from an outside via the outer edge (side surface) of the transparent sealing section is securely prevented.

The solid-state image sensing device of the present invention may be arranged such that the coil, the magnetic body, and the elastic body are all provided to the optical unit.

According to the invention, the coil, the magnetic body, and the elastic body are all provided to the optical unit. This allows the arrangement of the coil, the magnetic body and the elastic body in a close position, thereby realizing downsizing and reducing weight in the position adjusting section. Furthermore, it is possible to arrange the coil and the magnetic body close to each other, therefore can move the lens with a small magnetic force. Thus, it is possible to reduce the electric current consumption, and also leaking of magnetic force.

The solid-state image sensing device of the present invention may be arranged such that the magnetic body and the elastic body are provided to the optical unit, and the coil is provided to the image sensing unit.

According to the invention, the coil which construct the position adjusting section is provided to the image sensing unit. Consequently, arrangements (e.g. joints) for supplying electric current to the coil are not necessary in the optical unit. Therefore, the arrangement of the optical unit is simplified.

The solid-state image sensing device of the present invention may be arranged such that the magnetic body is embedded in a surrounding of the lens, one end of the elastic body is fixed to the lens holder, and the other end thereof is coupled with the magnetic body.

According to the invention, the magnetic body covers the surroundings of the lens. Therefore, the magnetic body holds the lens. The elastic body is fixed to the lens holder, and holds the magnetic body which holds the lens. That is to say, the elastic body indirectly holds the lens. The adjustment of the lens position is thus possible in a state where the position of the elastic body is fixed.

The solid-state image sensing device of the present invention may be arranged such that the optical unit and the image sensing unit are collectively sealed with resin.

According to the invention, the optical unit and the image sensing unit are integrated with resin. Thus, the shock-resistance and the environmental-resistance of the solid-state image sensing device are improved.

The solid-state device of the present invention may be arranged such that the optical unit includes a pressing member fixed to the lens holder, and a supporting section supporting the pressing member; and when the optical unit is fixed to the image sensing unit, the bottom surface of the lens holder and the surface of the sealing section are in contact with each other due to the pressing of the lens holder to the transparent lid section by the pressing member.

According to the invention, the optical unit is provided with a pressing member fixed to the lens holder and a supporting section supporting the pressing member. In addition, the pressing member presses the lens holder to the transparent lid section when fixing the optical unit and the image sensing unit. This causes the bottom surface of the lens holder and the surface of the sealing section to be in contact with each other. Thus, the optical unit is firmly fixed to the image sensing unit. Furthermore, the pressing member absorbs shock from the outside, thereby protecting the solid-state image sensing device from shock.

An electronic apparatus of the present invention includes the solid-state image sensing device of any one of the aforementioned solid-state image sensing devices.

According to the invention, the electronic apparatus is provided with the solid-state image sensing device of the present invention. Thus, it is possible to provide an electronic apparatus which can easily perform fine adjustment of the lens position.

An optical unit of the present invention is an optical unit which includes a lens and a lens holder holding the lens therein, the optical unit including: a position adjusting section for adjusting a position of the lens by moving the lens, independently of the lens holder, by use of electromagnetic force.

According to the invention, the position adjusting section adjusts the position of the lens by moving the lens by use of the electromagnetic force. In addition, the position adjusting section moves the lens, independently of the lens holder. This makes the load small on the position adjusting section when adjusting the lens position. Therefore, the fine adjustment is easily performed, and a high lens alignment precision is thus attained. Furthermore, this allows the response speed to increase when adjusting the lens position, as well as reducing the amount of electricity consumption required in the lens position adjustment.

The present invention may be applied to solid-state image sensing devices which are used to capture images in various image sensing devices (electronic apparatuses) such as portable phones with a built-in camera, digital still cameras, security cameras, and cameras for the purpose of installing to portable phones, vehicles, and interphones.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A solid-state image sensing device which includes an optical unit including a lens and a lens holder holding the lens therein, and an image sensing unit having a solid-state image sensor, the solid state image sensing device comprising:

a position adjusting section for adjusting a position of the lens by moving the lens itself, without moving the lens holder, by use of electromagnetic force, wherein the position adjusting section includes a coil, a magnetic body, and an elastic body, wherein the position adjusting section adjusts the lens position by expanding and contracting the elastic body, due to the electromagnetic force which acts between the coil and the magnetic body, wherein the optical unit and the image sensing unit are fixed detachably from each other, wherein the lens holder is fixed to the image sensing unit, wherein the image sensing unit includes a transparent lid section covering a receiving surface of the solid-state image sensor, and a sealing section sealing the image sensing unit with a sealing resin in such a manner that the transparent lid section is exposed, wherein the lens holder and the exposed part of the transparent lid section are engaged with each other, wherein a whole outer edge of the transparent lid section exposed from the sealing section is covered by the lens holder, and a bottom surface of the lens holder and a surface of the sealing resin is in contact with each other, and wherein the optical unit includes a pressing member fixed to the lens holder, and a supporting section supporting the pressing member, and when the optical unit is fixed to the image sensing unit, the bottom surface of the lens holder and the surface of the sealing section are in contact with each other due to the pressing of the lens holder to the transparent lid section by the pressing member.

2. The solid-state image sensing device as set forth in claim 1, wherein:

the coil or the magnetic body is provided to the lens holder, the elastic body is coupled with the coil or the magnetic body provided to the lens holder, and holds the lens.

3. The solid-state image sensing device as set forth in claim 1, wherein the coil, the magnetic body, and the elastic body are all provided to the optical unit.

4. The solid-state image sensing device as set forth in claim 1, wherein:
the magnetic body and the elastic body are provided to the optical unit; and
the coil is provided to the image sensing unit.

5. The solid-state image sensing device as set forth in claim 1, wherein:
the magnetic body is embedded in a surrounding of the lens, one end of the elastic body is fixed to the lens holder, and the other end thereof is coupled with the magnetic body.

6. The solid-state image sensing body as set forth in claim 1, wherein the optical unit and the image sensing unit are collectively sealed with resin.

7. The solid-state image sensing device as set forth in claim 1, wherein the optical unit is fixed to the image sensing unit by screwing the supporting section to the sealing section.

8. An electronic apparatus comprising a solid-state image sensing device, the solid-state image sensing device which includes an optical unit including a lens and a lens holder holding the lens therein and an image sensing unit having a solid-state image sensor, the solid-state image sensing device comprising:

a position adjusting section adjusting the position of the lens by moving the lens itself, without moving the lens holder, by use of electromagnetic force,
wherein the optical unit and the image sensing unit are fixed detachable from each other,
wherein the lens holder is fixed to the image sensing unit,
wherein the image sensing unit includes a transparent lid section covering a receiving surface of the solid-state image sensor, and a sealing section sealing the image sensing unit with a sealing resin in such a manner that the surface of the transparent lid section is exposed,
wherein the lens holder and the exposed part of the transparent lid section are engaged with each other,
wherein a whole outer edge of the transparent lid section exposed from the sealing section is covered by the lens holder; and a bottom surface of the lens holder and a surface of the sealing resin is in contact with each other,
wherein the optical unit includes a pressing member fixed to the lens holder, and a supporting section supporting the pressing member, and
when the optical unit is fixed to the image sensing unit, the bottom surface of the lens holder and the surface of the sealing section are in contact with each other due to the pressing of the lens holder to the transparent lid section by the pressing member.

* * * * *